United States Patent
Lan et al.

(10) Patent No.: US 7,576,900 B2
(45) Date of Patent: Aug. 18, 2009

(54) SYSTEM AND METHOD FOR HOLOGRAPHIC STORAGE

(75) Inventors: Yung-Song Lan, Hsinchu (TW); Chih-Ming Lin, Hsinchu (TW); Tzuan-Ren Jeng, Hsinchu (TW); Feng-Hsiang Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 11/504,009

(22) Filed: Aug. 15, 2006

(65) Prior Publication Data
US 2007/0153347 A1    Jul. 5, 2007

(30) Foreign Application Priority Data
Dec. 30, 2005    (TW) ............................... 94147757 A

(51) Int. Cl.
*G03H 1/26* (2006.01)
*G03H 1/00* (2006.01)
*G11B 7/00* (2006.01)
(52) U.S. Cl. ............................ 359/22; 359/30; 369/103
(58) Field of Classification Search ............... 359/22, 359/24, 30; 369/103
See application file for complete search history.

(56) References Cited

U.S. PATENT DOCUMENTS

| 5,519,651 A | * | 5/1996 | Redfield ..................... 365/125 |
| 6,700,686 B2 | | 3/2004 | King et al. |
| 6,721,076 B2 | | 4/2004 | King et al. |
| 6,909,529 B2 | | 6/2005 | Curtis |
| 2004/0212859 A1 | | 10/2004 | Tsukagoshi |

* cited by examiner

*Primary Examiner*—Alessandro Amari
(74) *Attorney, Agent, or Firm*—Harness, Dickey & Pierce, P.L.C.

(57) ABSTRACT

A system and a method for holographic storage mainly involve forming a holographic interference pattern in a holographic recording medium. The holographic storage system utilizes a light source to emit a coherent beam. The coherent beam is irradiated to a first reflector to form a divergent beam. The divergent beam is then irradiated to a second reflector to form collimating beams (a signal beam and a reference beam). The signal beam goes through a spatial light modulator (SLM) and is modulated by the SLM. After that, the reference beam and the modulated signal beam are irradiated to a convergent unit, and are directed to the holographic recording medium for forming the holographic interference pattern. The holographic storage system that the light source is split into a signal beam and a reference beam by a set of reflectors according to the reflection principle without involving refraction may employ wavelength multiplexing.

39 Claims, 21 Drawing Sheets

SYSTEM AND METHOD FOR HOLOGRAPHIC STORAGE

CROSS-REFERENCE TO RELATED APPLICATIONS

This non-provisional application claims priority under 35 U.S.C. § 119(a) on Patent Application No(s). 094147757 filed in Taiwan, R.O.C. on Dec. 30, 2005 the entire contents of which are hereby incorporated by reference.

BACKGROUND OF THE INVENTION

1. Field of Invention

The present invention relates to a system and method for holographic storage, and more particularly to a system and method for holographic storage using a set of reflectors to split a light source.

2. Related Art

At present, in the optical storage medium market, the capacity of a commercialized blue-ray disc cannot be larger than 100 GBytes, so various possible super capacity recording techniques are being developed in a wide range. Among these techniques, the holographic optical disc is the one with the most potential. Though the holographic recording technique has been developed for a long time, it cannot be applied to consumer optical storage commodities for various reasons. For example, all of the early holographic experiments required huge high-power laser light sources of hundreds of milliwatts and complicated optical systems, and a heavy vibration-free table. Moreover, the photo-refractive crystal usually used as the holographic recording medium is more expensive than other, more average-priced media. However, along with technical progress and conceptual changes, the limitations of the holographic storage recording technique have been eliminated one after another. For instance, miniaturized high-power lasers, high photosensitive recording materials, and miniature data access optical systems have been substantiality developed. Besides, the belief that a recording medium must be rewritable has wavered due to consumer behavior in the optical disc market. Till now, it was difficult to make the recording material of the rewritable photo-refractive crystal meet the requirements of favorable material property, high data safety, and low price. However, enlightened by the wide popularization of average-priced optical discs such as the write-once CD-R/DVD-R, holographic recording without using rewritable media materials has begun to be widely accepted. When not considering rewritability, many cheap organic materials of high photosensibility, for example: photopolymer, can be selected as the data-recording layer of the holographic optical disc. When the photopolymer is irradiated by strong recording light, a chemical reaction such as the linkage of molecules occurs. Therefore, recording of three-dimensional holographic interference fringes of data and data reproduction can be performed via changes in optical properties caused by manipulating the density of the molecule linkage. The aforementioned concept of miniature data access optical system having position-servo function comes from the servo mechanism of CD/DVD optical disc drives, which is the key point in using holographic optical discs.

U.S. Patent Gazette Publications No. 20040212859 and U.S. Pat. No. 6,700,686 disclose the application of the holographic storage technique in a transmissive holographic recording medium. As it is a transmissive design, the image sensor is disposed at the other side of the holographic recording medium. As such, the overall volume of the system is enlarged. Besides, the transmissive system architecture design usually has the optical axis of the object lens passing the signal beam perpendicular to the holographic recording medium, and the reference beam must be obliquely irradiated to the holographic recording medium. Therefore, the relative position and direction between the reference beam and the holographic recording medium deviate easily. Once the deviation occurs, the reproduced signal beam will not be formed if the reference beam cannot be irradiated to the holographic recording medium along the original path. Thus, the produced signal beam cannot be captured by adjusting the signal beam path. Therefore, the image sensor for receiving produced light signals cannot receive any reproduced beam signals, and, of course, it cannot recover the correct reproduced data by an image processing technique. Though for a static holographic recording medium, the reproduced beam signal can be obtained if the architecture allows for scanning the position and direction of reference beams in a small range. However, as for a continuously moving holographic recording medium, it is still hard to achieve the same purpose of obtaining the reproduced signal.

Other relative arts disclosed in U.S. Pat. No. 6,721,076 and U.S. Pat. No. 6,909,529 provide an optical architecture for reflective holographic recording medium. However, no specific servo methods are provided.

In addition, U.S. Pat. No. 6,909,529 provides an optical architecture for a reflective holographic recording medium with servo. However, as the light beams are all focused by lenses as convergent elements, wavelength multiplexing cannot be applied.

SUMMARY OF THE INVENTION

According to one aspect of the invention, a holographic storage system is provided. The system mainly involves forming a holographic interference pattern in a holographic recording medium. The holographic storage system utilizes a light source to emit a coherent beam. The coherent beam is irradiated to a first reflector to form a divergent beam. The divergent beam is then irradiated to a second reflector to form collimating beams and then split the collimating beams into a signal beam and a reference beam. The signal beam goes through a SLM and is modulated by the SLM. After that, the reference beam and the modulated signal beam are irradiated to a convergent unit and then directed to the holographic recording medium for forming the holographic interference pattern.

According to another aspect of the invention, a holographic storage method is provided. In the method of the present invention, a coherent beam is generated first and irradiated to a set of reflectors to form a signal beam and a reference beam collimating and parallel with each other. Then, the signal beam is modulated. After that, the modulated signal beam and the reference beam are directed into the holographic recording medium to generate the holographic interference pattern.

Accordingly, it is an object of the present invention to provide a system and method for holographic storage without involving refraction; therefore, a wavelength multiplexing mechanism can be applied, and other multiplexing mechanisms such as peristrophic multiplexing or phase multiplexing can be added to raise the storage capacity of the holographic recording medium.

Accordingly, it is another object of the present invention to provide a system and method for holographic storage as described above which is easy to be fabricated due to the modularity thereof, and is compatible with conventional recording media such as the CD, DVD or BD (HD-DVD).

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
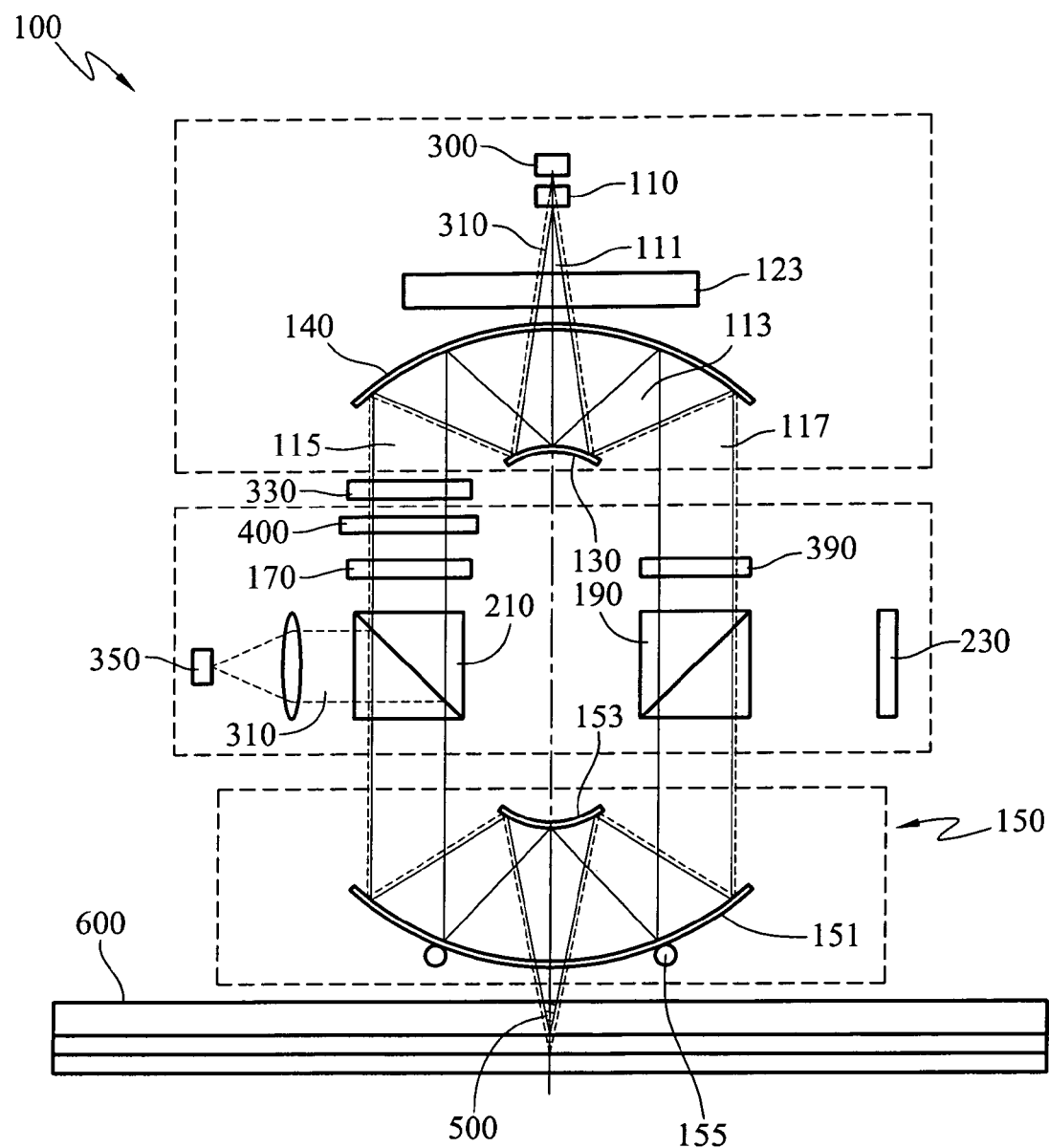
FIG. 1 is a schematic diagram of the recording of the holographic storage system of the invention.
Figure 6:
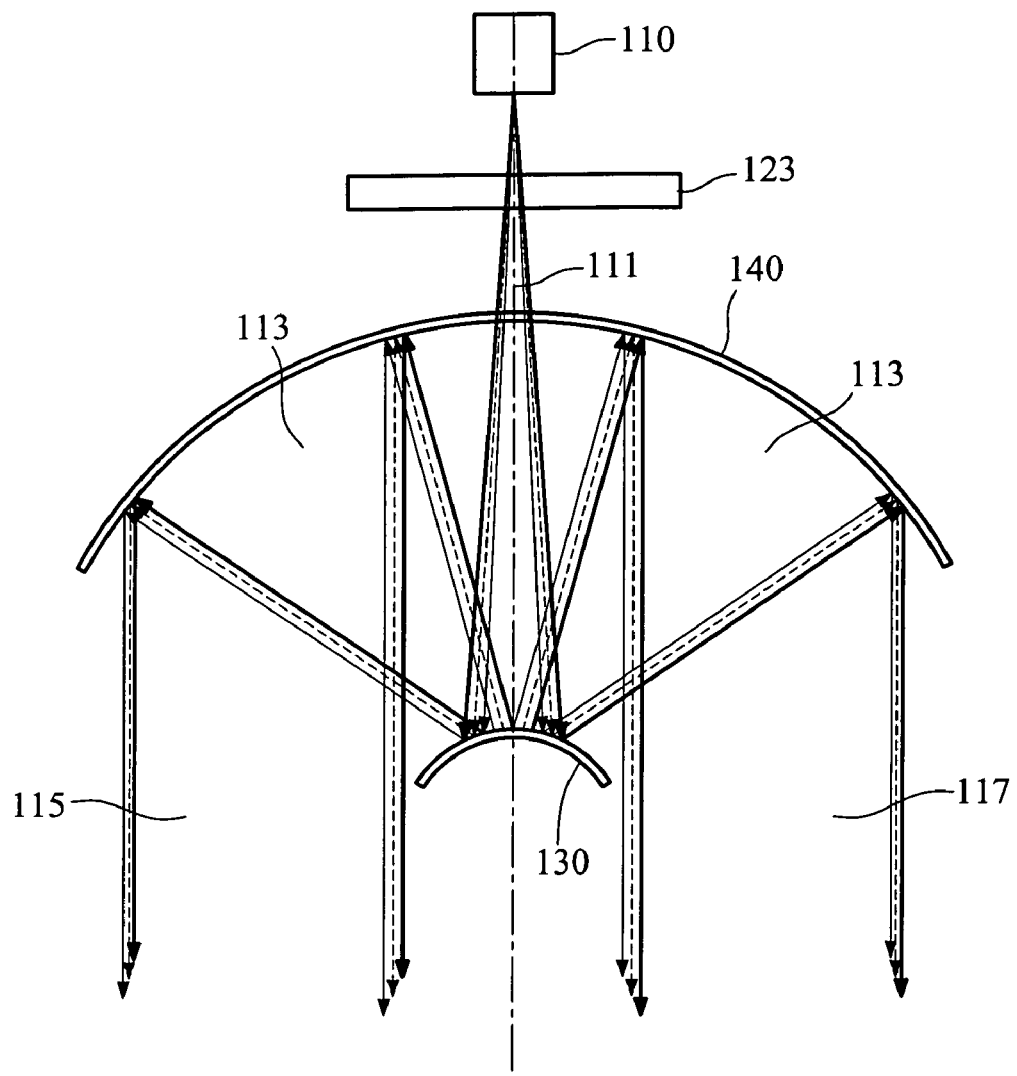
FIG. 6 is a schematic diagram of the light source diverged after being irradiated to the first reflector and the second reflector according to the invention.

Referring to FIG. 1, it is a schematic diagram of the recording of the holographic storage system according to the present invention. The present invention is a holographic storage system 100 for generating a holographic interference pattern 500 in a holographic recording medium 600. Therefore, the holographic storage system 100 uses a light source 110 to generate a coherent beam 111. The coherent beam 111 is irradiated to a first reflector 130 to form a divergent beam 113. The divergent beam 113 is then irradiated to a second reflector 140 to form two beams, i.e., a signal beam 115 and a reference beam 117 as shown in FIG. 6. A spatial light modulator (SLM) 170 is disposed in the signal beam path, to make the signal beam 115 go through the SLM 170 to become a modulated signal beam 115. Afterward, the reference beam 117 and the modulated signal beam 115 are irradiated to the convergent unit 150 to direct the modulated signal beam 115 in the holographic recording medium 600. When the signal beam 115 and the reference beam 117 intersect in the holographic recording medium 600, the holographic interference pattern 500 is generated and recorded in a recording layer 610 of the holographic recording medium 600. However, in order to gather the optical efficiency of the signal beam 115 and the reference beam 117, the two beams can be modulated into two rectangular collimating beams with the combination and adjustment of the first reflector 130 and the second reflector 140. Therefore, the coherent beam 111 generated by the light source 110 can be completely converted into the signal beam 115 and the reference beam 117.

Figure 2:
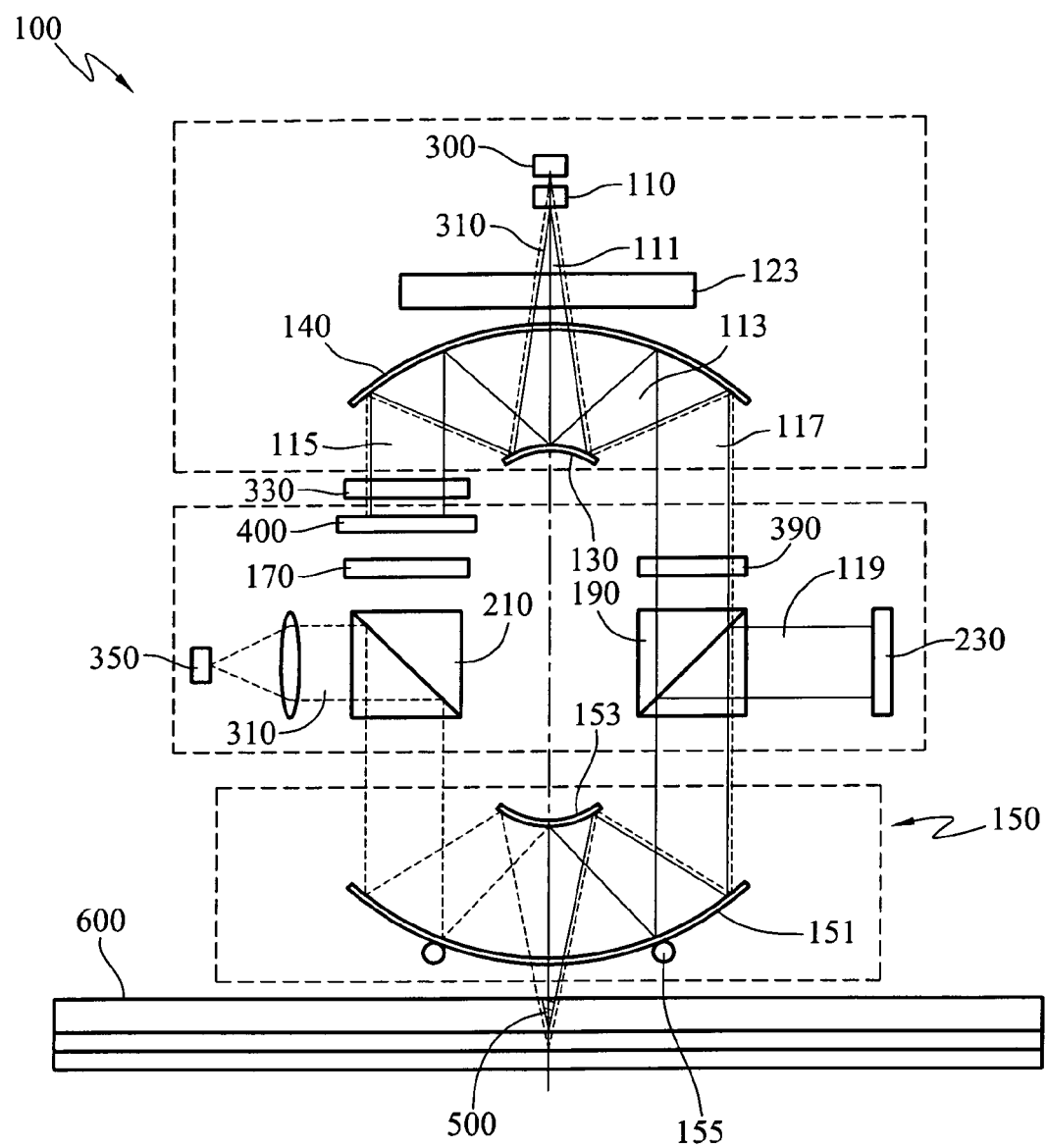
FIG. 2 is a schematic diagram of the reproducing of the holographic storage system of the invention.

Referring to FIG. 2, it is a schematic diagram of the reproducing of the holographic storage system according to the invention. When the reference beam 117 is irradiated to the holographic interference pattern 500 of the holographic recording medium 600, a reproduced beam 119 is generated. To make the reproduced beam 119 return along the path of the reference beam 117, a wavelength selecting film 630 is added between the recording layer 610 of the holographic recording medium 600 and the servo track 650. The wavelength selecting film 630 reflects all the lights emitted by the light source, so the reproduced beam reflected by the wavelength selecting film returns along the path of the reference beam 117. The first beam splitter 190 is disposed on the path of the reference beam 117. When the reproduced beam 119 is irradiated to the first beam splitter 190, the reproduced beam 119 is reflected by the first beam splitter 190 to be irradiated to an image sensor 230, for reading the optical signal of the reproduced beam 119.

Moreover, in order to prevent the signal beam irradiated to the holographic recording medium 600 during the reproduction, a shutter 400 is added in the path of the signal beam 115 for controlling the passing of the signal beam 115. Therefore, when the system is in a recording state, the shutter 400 makes the signal beam 115 go through. If the system is in a reproducing state, the shutter 400 blocks the signal beam 115, to prevent the signal beam 115 and the reference beam 117 from being irradiated to the holographic recording medium 600 again and avoiding interference of the signal of the reproduced beam 119.

As the signal beam 115 goes through the SLM 170, the SLM 170 is a transmissive SLM, for example, a transmissive liquid crystal panel.

Figure 3:
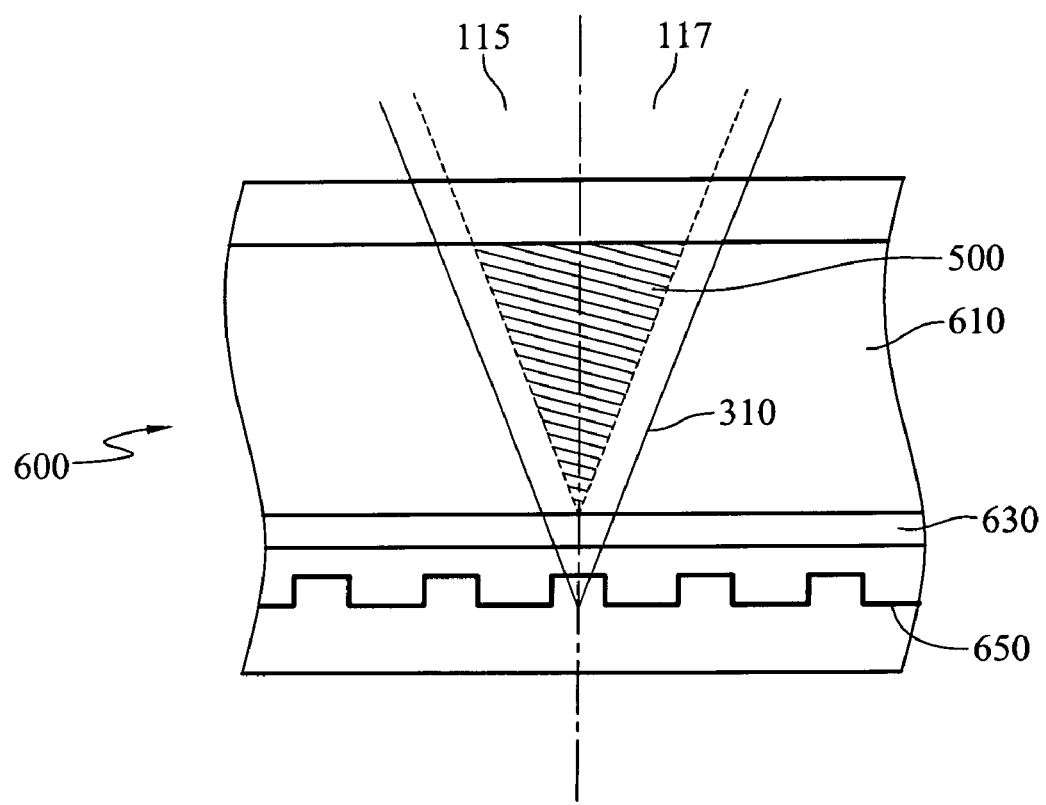
FIG. 3 is a schematic diagram of the signal beam, reference beam, and servo beam directed in the holographic recording medium.
Figure 5A:
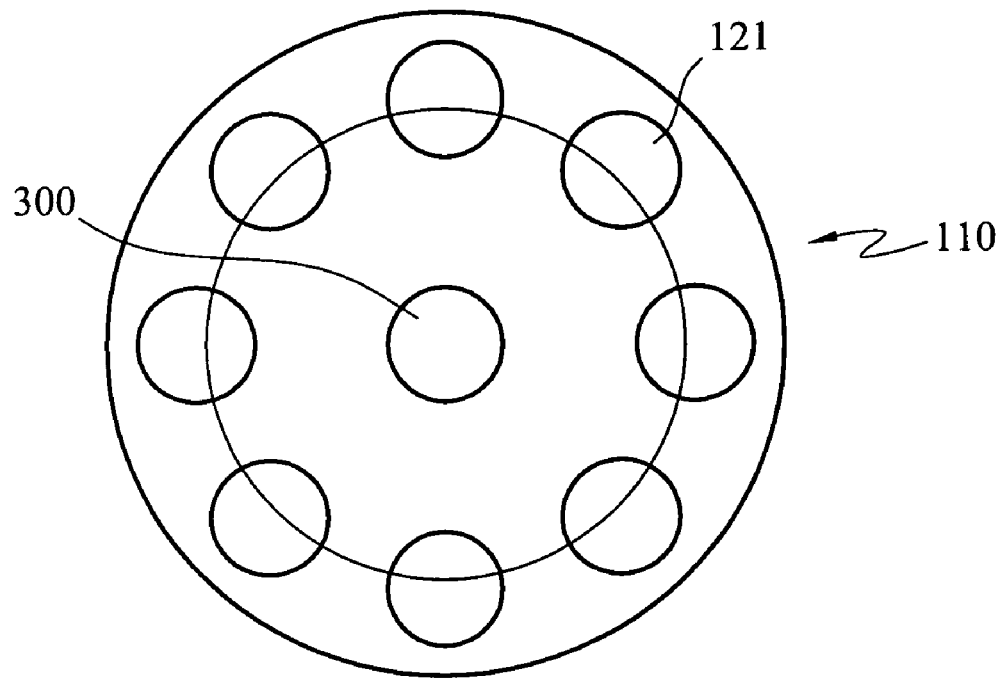
FIGS. 5A and 5B are schematic comparison diagrams of the positions of the servo light source and the light source.
Figure 5B:
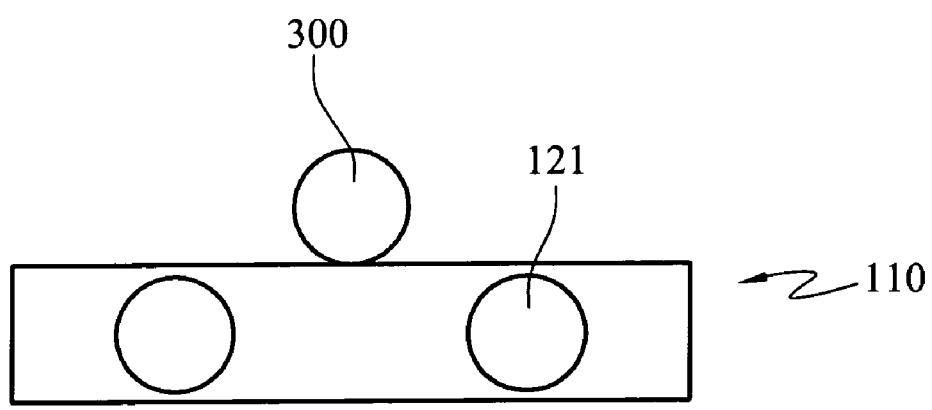

To make the holographic interference pattern 500 continuously stored in the holographic recording medium 600, a servo track 650 is disposed in the holographic recording medium 600. A servo beam 310 generated by a servo light source 300 is also disposed on the light source 110 for converting the servo beam 310 into two beams in parallel after irradiating the servo beam 310 to the first reflector 130 and the second reflector 140. The two beams are irradiated along the paths of the signal beam 115 and the reference beam 117 respectively, and both are directed to the holographic recording medium 600. In order to avoid having the focuses of the servo beam 310 and the signal beam 115 overlap each other, the position of the servo light source 300 is deviated from that of the light source 110, as shown in FIGS. 5A and 5B. As such, when the servo beam 310 is irradiated to the first reflector 130 and reflected to be irradiated to the second reflector 140, as the servo light source 300 and the light source 110 are located at different positions, the position and size of the servo beam 310 incident to the first reflector 130 are different. Therefore, the focuses of the servo beam 310 through the first reflector 130, the second reflector 140, and the convergent unit 150 are different, as shown in FIG. 3. Moreover, in order to prevent the servo beam 310 interfering in the holographic recording medium 600, a filter 330 is added in the path of the signal beam 115 for filtering the servo beam 310 in the path of the signal beam 115. As such, only the servo beam 310 along the path of the reference beam 117 is irradiated to the servo track 650 of the holographic recording medium 600. The servo beam 310 is reflected after being modulated by the servo track 650 and is continuously transmitted toward the path of the signal beam 115. Further, before the servo beam 310 modulated by the servo track 650 goes through the filter 330, the second beam splitter 210 is disposed in the path of the signal beam 115 to make the servo beam 310 modulated by the servo track 650 irradiated to the second beam splitter 210 and reflected to be incident to the sensing control portion 350, for capturing the modulated servo beam 310. The signal is compatible with conventional recording media such as the CD, DVD or BD (HD-DVD). Therefore, the holographic interference pattern 500 can be continuously stored in the holographic recording medium 600 along the servo track 650. Further, as the servo beam can go through the wavelength selecting film 630 in the holographic recording medium 600, the wavelength selecting film 630 has no negative influence. The image sensor 230, therefore, may be a light detecting device.

Moreover, before the servo mechanism is started, the surface of the optical axis is adjusted to be perpendicular to the recording medium. Thus, a tilt sensor 155 is added to the convergent unit 150 for facilitating the control system (not shown) to control the oblique angle of the convergent unit 150, thereby making the signal beam 115, the reference beam 117, and the servo beam 310 perpendicularly irradiated to the holographic recording medium 600. In the present embodiment, the oblique angle of the third reflector 151 is sensed by four tilt sensors 155 respectively located at both sides of the holographic storage system 100.

In order to convert the coherent beam 111 generated by the light source 110 into parallel beams by irradiating the coherent beam 111 to the first reflector 130 and the second reflector 140, i.e., the signal beam 115 and the reference beam 117. The first reflector 130 is a convex mirror, and the second reflector 140 is a concave mirror, for converting the coherent beam 111 into the divergent beam 113 after the coherent beam 111 is irradiated to the first reflector 130. Then, the divergent beam 113 is split into the signal beam 115 and the reference beam 117 after being irradiated to the second reflector 140.

However, to make the signal beam 115 and the reference beam 117 as two ideal parallel beams, the first reflector 130 is a convex hyperbolic mirror and the second reflector 140 is a concave parabolic mirror. By such a combination, the signal beam 115 and the reference beam 117 have better parallelism.

The convergent unit 150 is used to direct the signal beam 115 and the reference beam 117 in parallel again. The convergent unit 150 adopts the combination of the third reflector 151 and a fourth reflector 153. The third reflector 151 converts the reference beam 117 and the modulated signal beam 115 into a convergent beam. After irradiated to the fourth reflector 153, the convergent beam will be directed into the holographic recording medium 600 again and interfered with each other to generate the holographic interference pattern 500.

Therefore, the third reflector 151 is a concave mirror and the fourth reflector 153 is a convex mirror. As such, the signal beam 115 and the reference beam 117 is directed in the holographic recording medium 600 at the focus after being irradiated in parallel to the reflector 151 and the fourth reflector 153.

Likewise, to make the signal beam 115 and the reference beam 117 preferably directed into a focus, the concave mirror is a parabolic mirror, and the convex mirror is a hyperbolic mirror. Therefore, the signal beam 115 and the reference beam 117 can be converted into two convergent beams after being irradiated to the third reflector 151 in the form of a concave paraboloid. The two convergent beams are directed into the focus by being irradiated to the fourth reflector 153 in the form of a convex hyperboloid. Thus, by disposing the holographic recording medium 600 on the focus, the signal beam 115 and the reference beam 117 can be directed into the holographic recording medium 600.

Figure 7A:
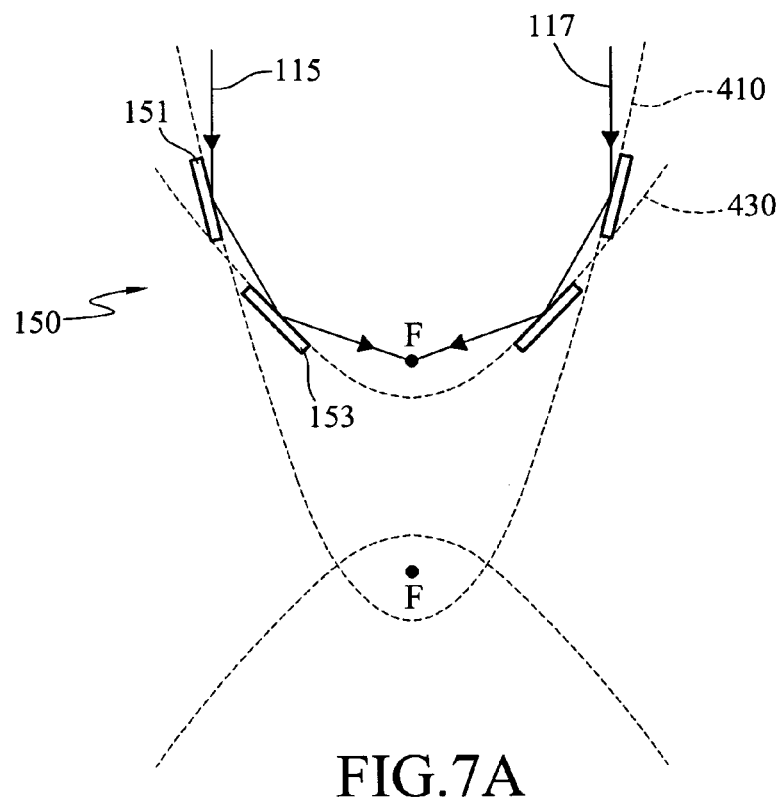
FIGS. 7A and 7B are schematic diagrams of the convergent unit according to another embodiment of the invention.
Figure 7B:
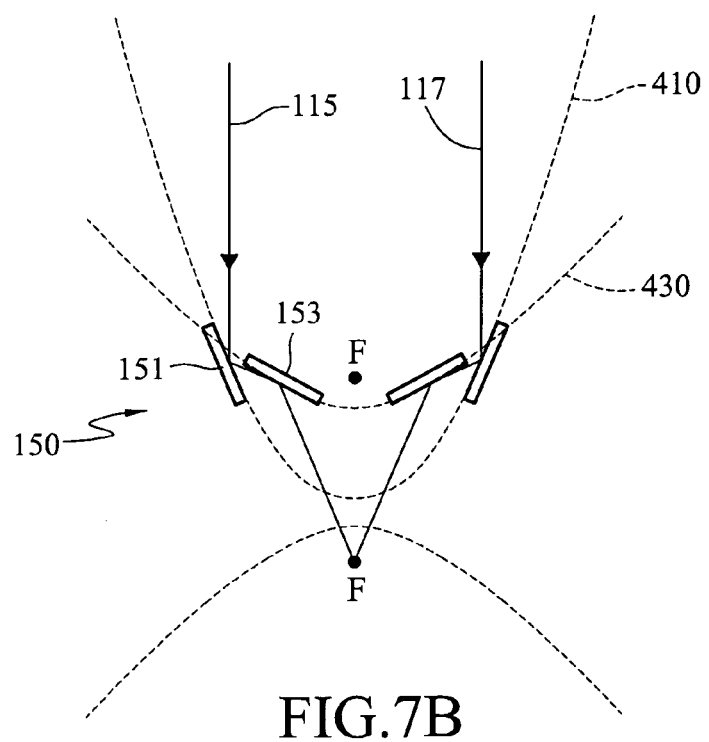

Referring to FIGS. 7A and 7B, they are schematic diagrams of another embodiment of the convergent unit according to the present invention. In addition to the third reflector 151 and the fourth reflector 153 which are a concave parabolic mirror and a convex hyperbolic mirror respectively, the third reflector 151 and the fourth reflector 153 can be flat mirrors but arranged according to a parabolic curve 410 and a hyperbolic curve 430. The focuses of the parabolic curve 410 and the hyperbolic curve 430 are coincident. As such, though the third reflector 151 and the fourth reflector 153 are flat, they function in the same way as a parabolic mirror and a hyperbolic mirror. As a result, the signal beam 115 and the reference beam 117 are directed on the focus F after being irradiated to the third reflector 151 arranged on the parabolic curve 410 and the fourth reflector 153 arranged on the hyperbolic curve 430.

Furthermore, the first reflector 130, the second reflector 140, the third reflector 151, and the fourth reflector 153 can achieve the required purpose via the combination of a spherical reflector and an aspheric reflector.

The coherent beam 111 generated by the light source 110 is split by reflecting the first reflector 130 and the second reflector 140, and the convergent unit 150 also directs light with the third reflector 151 and the fourth reflector 153 instead of refracting. As such, the holographic storage system of the invention can employ a multi-wavelength light source 110, so there will be no color difference.

The multi-wavelength light source 110 is used to generate the multi-wavelength coherent beam 111, so the light source 110 can be formed of more than one secondary light source 121. Each secondary light source 121 can emit a coherent beam 111 of a certain wavelength, or the light source 110 is tunable wavelength, such as distributed feedback laser (DFB Laser), vertical cavity surface emitting laser (VCSEL), wavelength-tunable carbon dioxide laser, or distributed Bragg reflector laser (DBR Laser).

Figure 4A:
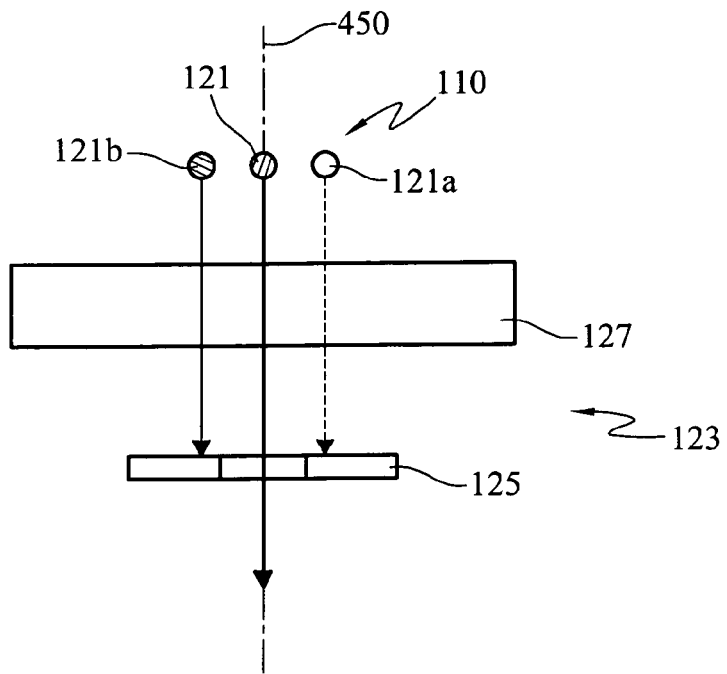
FIGS. 4A and 4B are schematic diagrams of the wavelength selector of the invention.
Figure 4B:
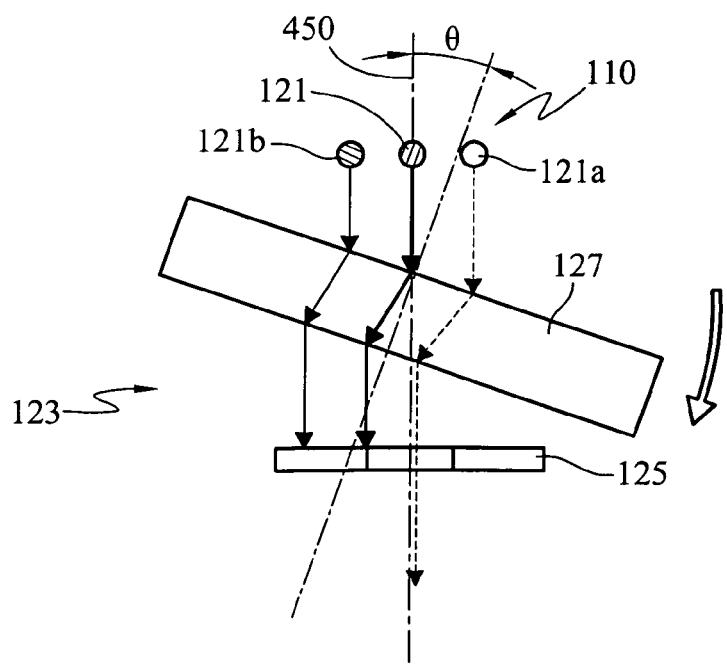

Referring to FIGS. 4A and 4B, they are schematic diagram of the wavelength selector of the invention. The wavelength selector 123 is mainly used to select light of a certain wavelength by making the desired light go through. As the present embodiment uses a recording and reproducing light source of a wavelength at a time, when multiple secondary light sources 121 are used as the multi-wavelength light source 110, to make the recording or reproducing light source have a specific wavelength at a time, the wavelength selector 123 can be used to select the wavelength. Therefore, light of a certain wavelength passes through the selector and is irradiated to the first reflector 130. The wavelength selector 123 includes an aperture stop 125 and a plate glass 127. The aperture stop 125 is used to limit the field of view angle of the incident beam. When the plate glass 127 keeps still and the secondary light sources 121, 121a, and 121b are perpendicularly irradiated to the plate glass 127, the secondary light sources 121, 121a, and 121b go through the plate glass 127 directly. At this time, only the secondary light source 121 can pass through the aperture stop 125, while others are blocked. When the plate glass 127 is rotated an angle θ about the optical axis 450, the incident beam is obliquely irradiated to the plate glass 127, and the emergent beam is parallel with but a distance away from the incident beam. Therefore, when the plate glass 127 is rotated, the secondary light sources 121, 121a, and 121b are obliquely irradiated to the plate glass 127. Then, the secondary light sources 121, 121a, and 121b are moved along the optical axis 450 for a distance. As such, the secondary light source 121 is blocked by the aperture stop 125, and the secondary light source 121a can pass through the aperture stop 125. As a result, light of a certain wavelength can pass through the aperture stop 125 to be irradiated to the first reflector 130 by rotating the plate glass 127.

Figure 8:
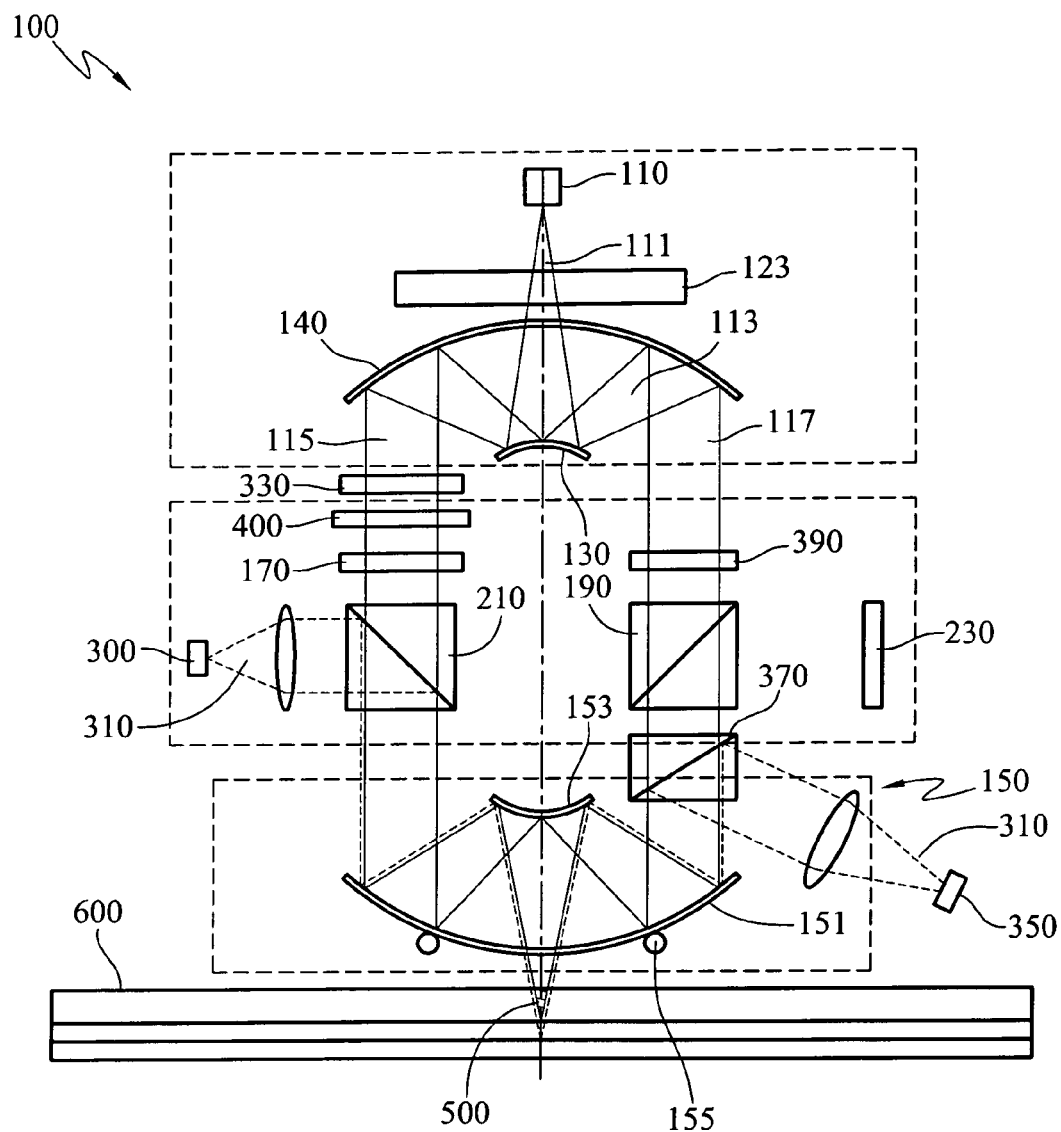
FIG. 8 is a schematic diagram of the recording of the holographic storage system according to the second embodiment of the invention.
Figure 9:
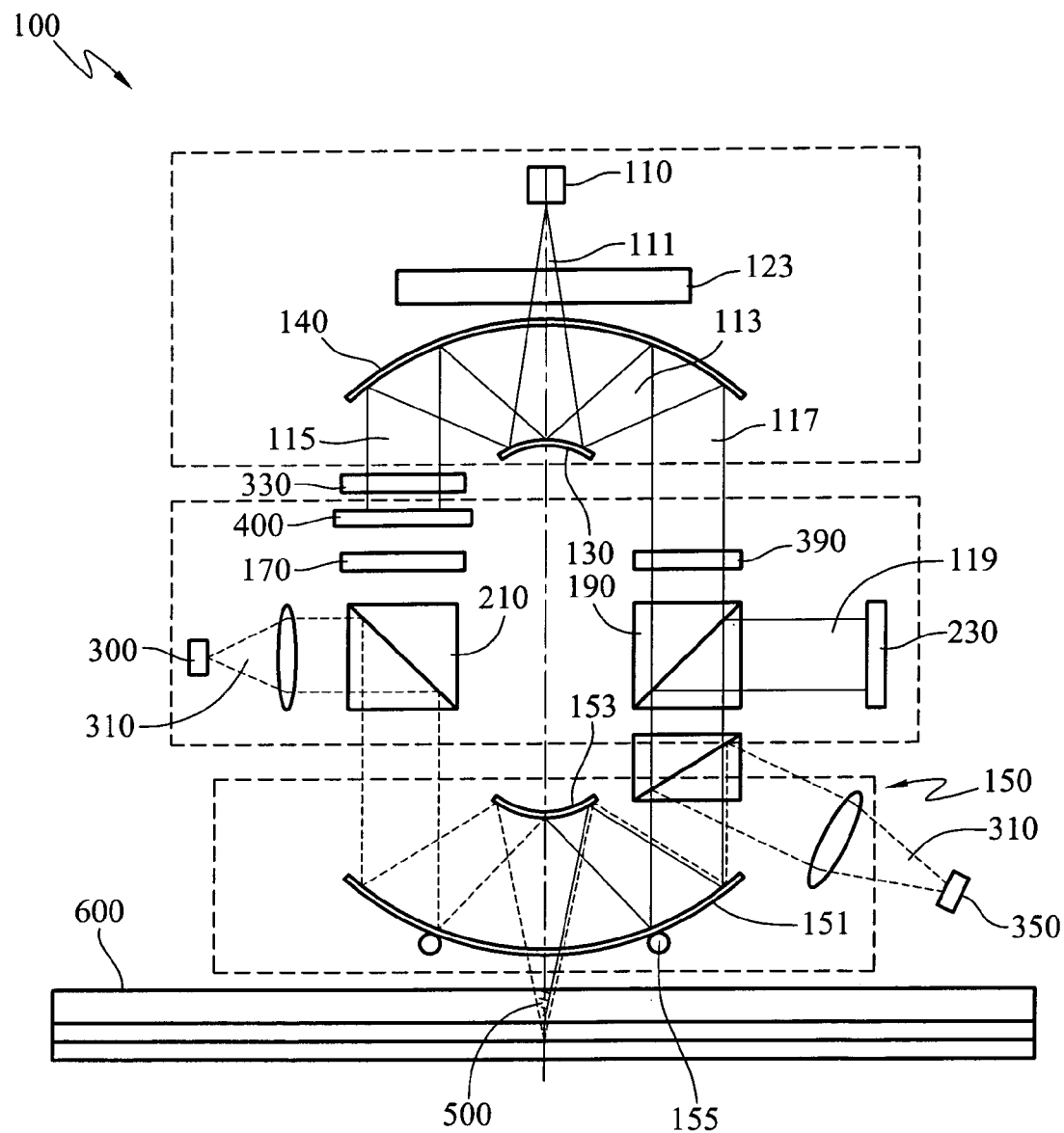
FIG. 9 is a schematic diagram of the reproducing of the holographic storage system according to the second embodiment of the invention.

Referring to FIGS. 8 and 9, they are schematic diagrams of the recording and reproducing of the holographic storage system according to the second embodiment of the invention. The present embodiment adopts the optical architecture of the last embodiment. However, the servo light source 300 is disposed at one side of the second beam splitter 210. Therefore, the servo beam 310 generated by the servo light source 300 is reflected by the second beam splitter 210 and is irradiated to the convergent unit 150 along the path of the signal beam 115. Then, the servo beam 310 is irradiated to the servo track 650 of the holographic recording medium 600 via the convergent unit 150. After that, the servo beam 310 is reflected to be irradiated to the convergent unit 150 again and then returns along the path of the reference beam 117. At this time, a dichroic beam splitter 370 is added in the path of the reference beam 117. The dichroic beam splitter 370 can reflect light of a certain wavelength, for example, the servo beam 310 without affecting lights of other wavelengths, so the reference beam 117 can pass through. Therefore, when the servo beam 310 returns via the convergent unit 150 along the path of the reference beam 117, it is reflected by the dichroic beam splitter 370 and then irradiated to the sensing control portion 350. The signal is compatible with conventional recording media such as the CD, DVD or BD (HD-DVD). The holographic interference pattern 500 can be continuously formed in the holographic recording medium 600 along the servo track 650 and recorded by the holographic recording medium 600.

As the servo light source 300 is disposed at one side of the second beam splitter 210 instead of at the position of the light source 110 in the last embodiment, the servo beam 310 will not be split into two beams via the first reflector 130 and the second reflector 140. Therefore, the servo beam 310 will not interfere with the holographic recording medium 600, so the filter 330 is not necessary here.

The optical architecture of the invention can apply various multiplexing mechanisms, such as wavelength multiplexing, phase multiplexing, peristrophic multiplexing, for improving the storage capacity. If a spatial phase modulator 390 is added in the path of the reference beam 117, such as ground glass, for changing phase, thereby making the present embodiment have a phase multiplexing mechanism. Besides, as the light source 110 has various wavelengths, different holographic interference patterns 500 are generated by different wavelengths.

As two beams are generated after the coherent beam 111 is irradiated to the first reflector 130 and the second reflector 140, wherein one beam pass through the SLM 170 and becomes a beam modulated by the SLM 170, i.e., the signal beam 115, and the beam symmetric to the signal beam 115 about the optical axis is the reference beam 117. Therefore, when the SLM 170 is rotated about the optical axis, the incident direction of the modulated beam also rotates about the optical axis, so the holographic storage system of the invention has a peristrophic multiplexing mechanism.

Figure 10:
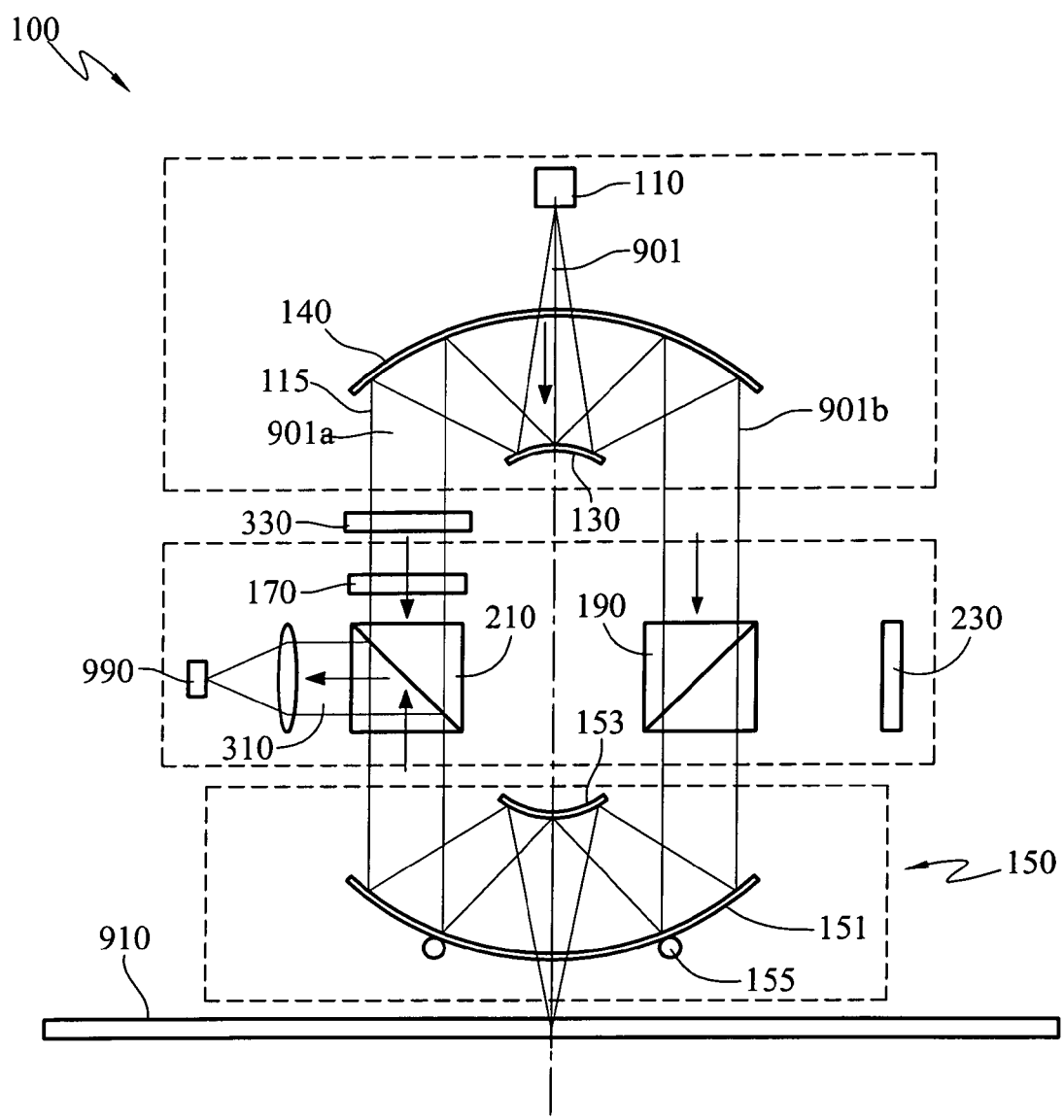
FIGS. 10, 12, and 13 are schematic diagrams of the holographic storage system compatible with the traditional compact disc according to the third embodiment of the invention.
Figure 11:
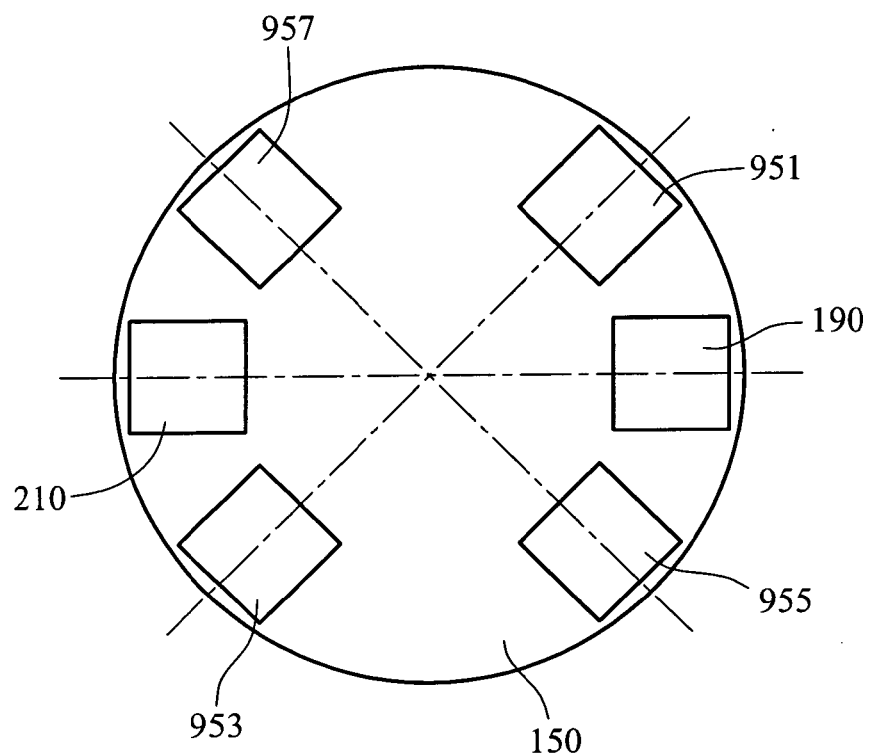
FIG. 11 is a top view schematic diagram of the system according to the third embodiment of the invention.

FIG. 10 is a schematic diagram of the holographic storage system compatible with the traditional compact disc according to the third embodiment of the invention. And FIG. 11 is a top view schematic diagram of the system. In FIG. 10, the whole structure is similar to that of the first embodiment. Therefore, the composed structure of the third embodiment is not discussed again. The light source 110 is used to produce a recording/reproducing light 901. When the recording/reproducing light 901 is incident upon the first reflector 130, the recording/reproducing light 901 is reflected by the first reflector 130 and then the recording/reproducing light 901 is incident upon the second reflector 140; two parallel recording/reproducing lights 901a, 901b are hence formed. The recording/reproducing lights 901a, 901b are focused on a second recording medium 910 through the third reflector 151 and the fourth reflector 153. Therefore, the recording/reproducing lights 901a, 901b may be incident upon the focusing unit 150, and then are incident upon the second recording medium 910 located on the position of the holographic recording medium, so as to record data on the second recording medium 910. Again, when the recording/reproducing lights 901a, 901b are incident upon the data-recorded second recording medium 910, the recording/reproducing lights 901a, 901b are modulated and reflected by the second recording medium 910. Then the lights 901a, 901b are incident upon the focusing unit 150 again, and then emit to the second beam splitter 210 with an incident angle form the focusing unit 150. Next, the recording/reproducing lights 901a, 901b emitted from the focusing unit 150 turns to the incident light detecting device 990 due to the reflection by the second beam splitter 210.

Figure 12:
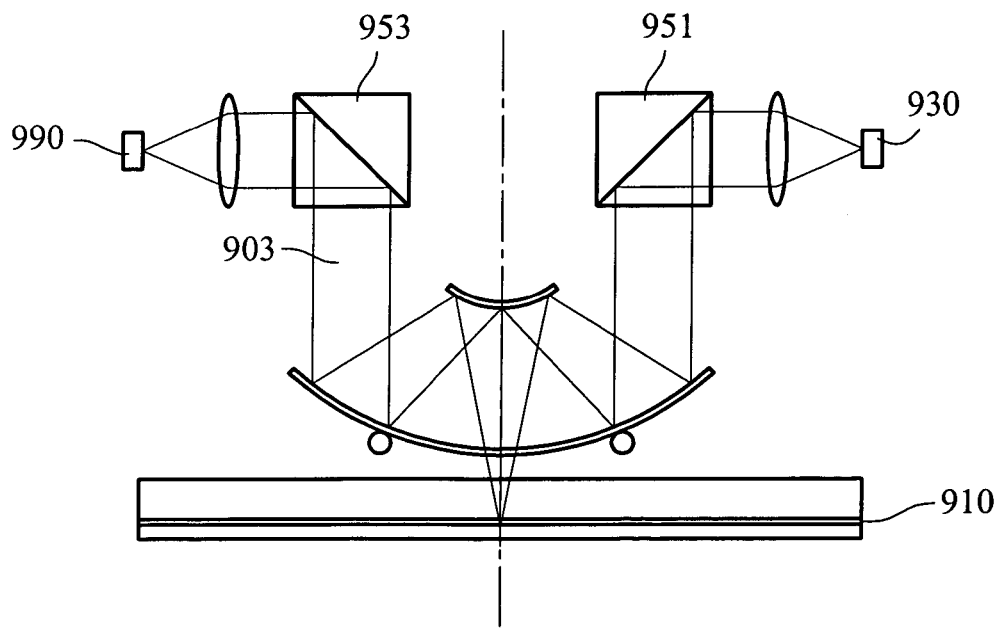
Figure 13:
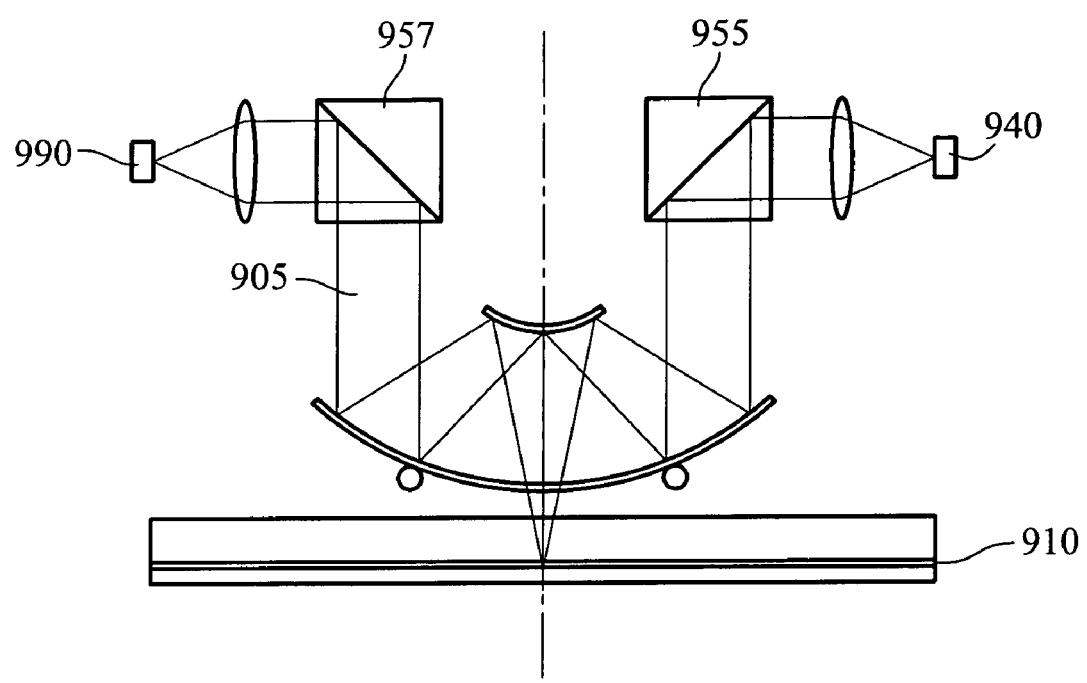

In this embodiment, the light source 110 may be a blue laser, and the second recording medium 910 is a recording CD capable of use in the blue laser. As shown in FIG. 11, in the third embodiment, other light source may be disposed on the position of the servo light source excepting the position of the light source such as the wavelength of 780 nm of infrared ray laser or the wavelength of 650 nm of red light laser. In FIG. 11, different beam splitter locations are utilized to express different optic frameworks. In this embodiment, three optic structures are represented. One of the optic structures is depicted as shown in FIG. 10. Another two optic structures will be described later. As shown in FIGS. 12 and 13, the second light source 930 and the third light source 940 may represent the wavelength of 780 nm of infrared ray laser and the wavelength of 650 nm of red light laser, respectively. The second light source 930 and the third light source 940 are used to produce the recording/reproducing lights 903, 905. The recording/reproducing lights 903, 905 are reflected and turned to the focusing unit 150 with an incident angle. Then, the lights 903, 905 are incident upon the second recording medium 910 by the focusing unit 150, so as to record data on the second recording medium 910. If the recording/reproducing lights 903, 905 are incident upon the data-recorded second recording medium 910, the lights 903, 905 will be modulated by the second recording medium 910 and then will reflect the modulated recording/reproducing lights 903, 905. Then, the modulated recording/reproducing lights 903, 905 are incident upon the focusing unit 150 and emit to a fourth beam splitter 953 and a sixth beam splitter 957, respectively. Again, the lights 903, 905 are incident upon the light detecting device 990 because they are affected by the fourth beam splitter 953 and the sixth beam splitter 957. Therefore, the second recording medium 910 can be the Compact Disc (CD) or Digital Video Disc (DVD) in market.

Hence, the holographic storage system not only can be used as a holographic recording but also can support the CD, DVD, and BD (HD-DVD).

Figure 14:
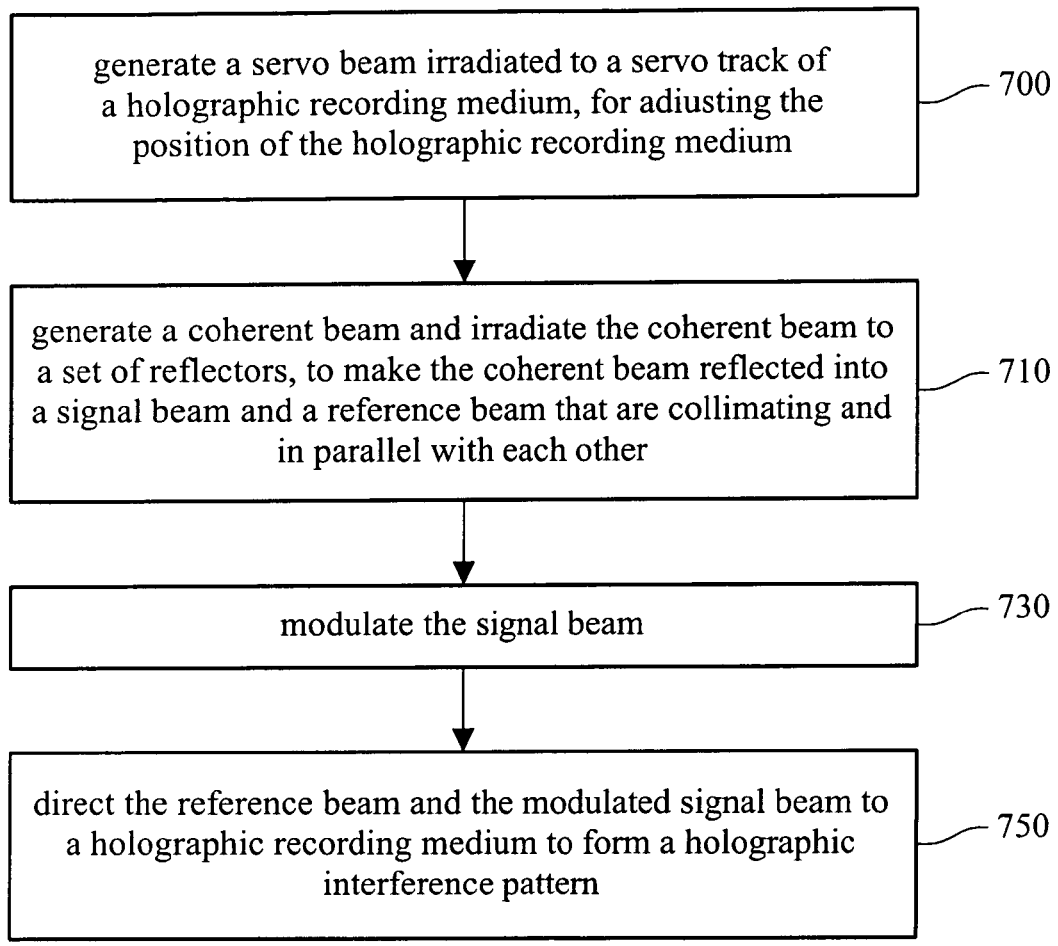
FIGS. 14, 15, and 16 are flow charts of the first method of the invention.

Referring to FIG. 14, it is a flow chart of the first method of the invention. A holographic storage method of the invention involves first generating a servo beam incident to a servo track of a holographic recording medium, for modulating the position of the holographic recording medium (Step 700). After that, a coherent beam is generated and irradiated to a set of reflectors, to make the coherent beam reflect into a signal beam and a reference beam which are collimating and in parallel with each other (Step 710). Then, the signal beam is modulated (Step 730). The reference beam and the modulated signal beam are directed to the holographic recording medium to form a holographic interference pattern (Step 750).

Figure 15:
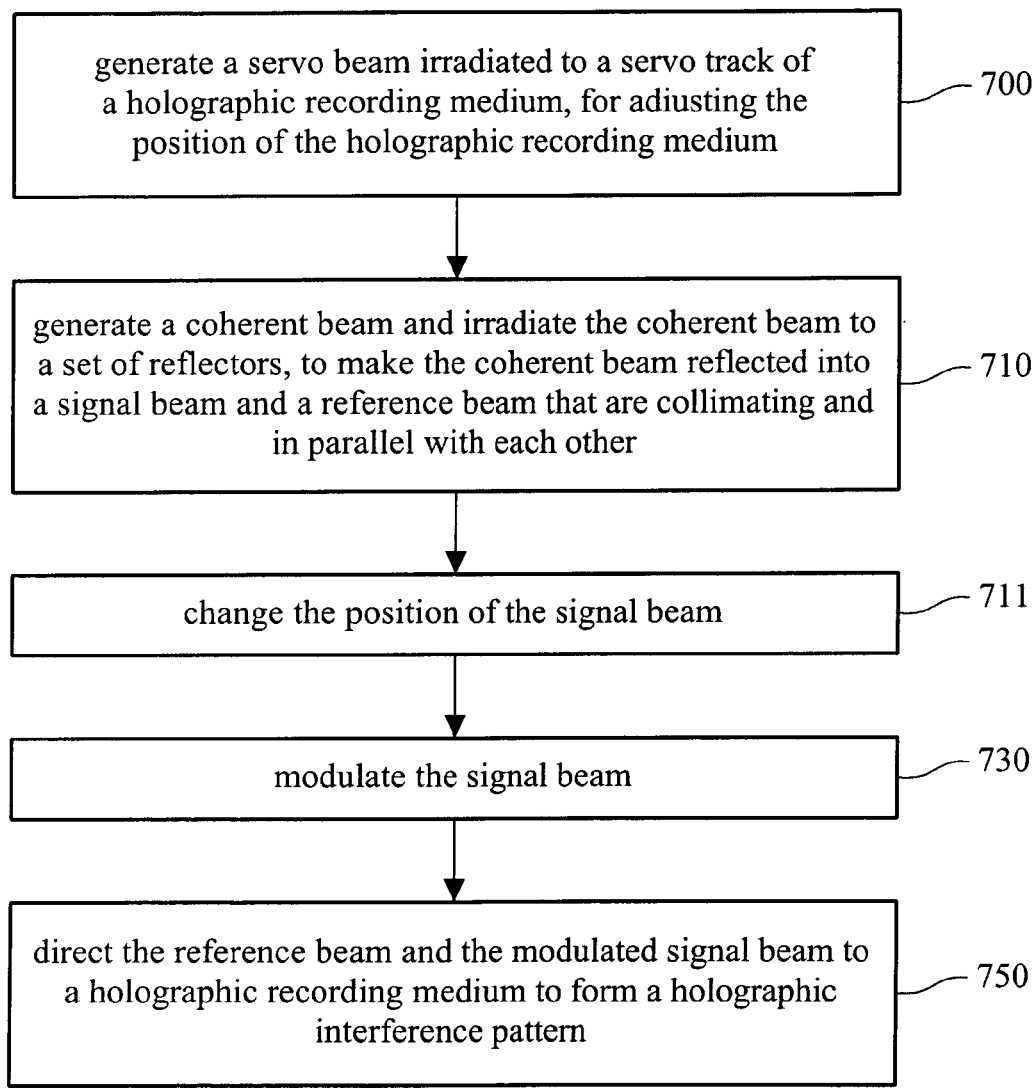

Referring to FIG. 15, after a coherent beam is generated and irradiated to a set of reflectors for reflecting the beam into a signal beam and a reference beam that are collimating and in parallel with each other (Step 710), the position of the signal beam is changed (Step 711). Therefore, the holographic storage method has a peristrophic multiplexing mechanism.

Figure 16:
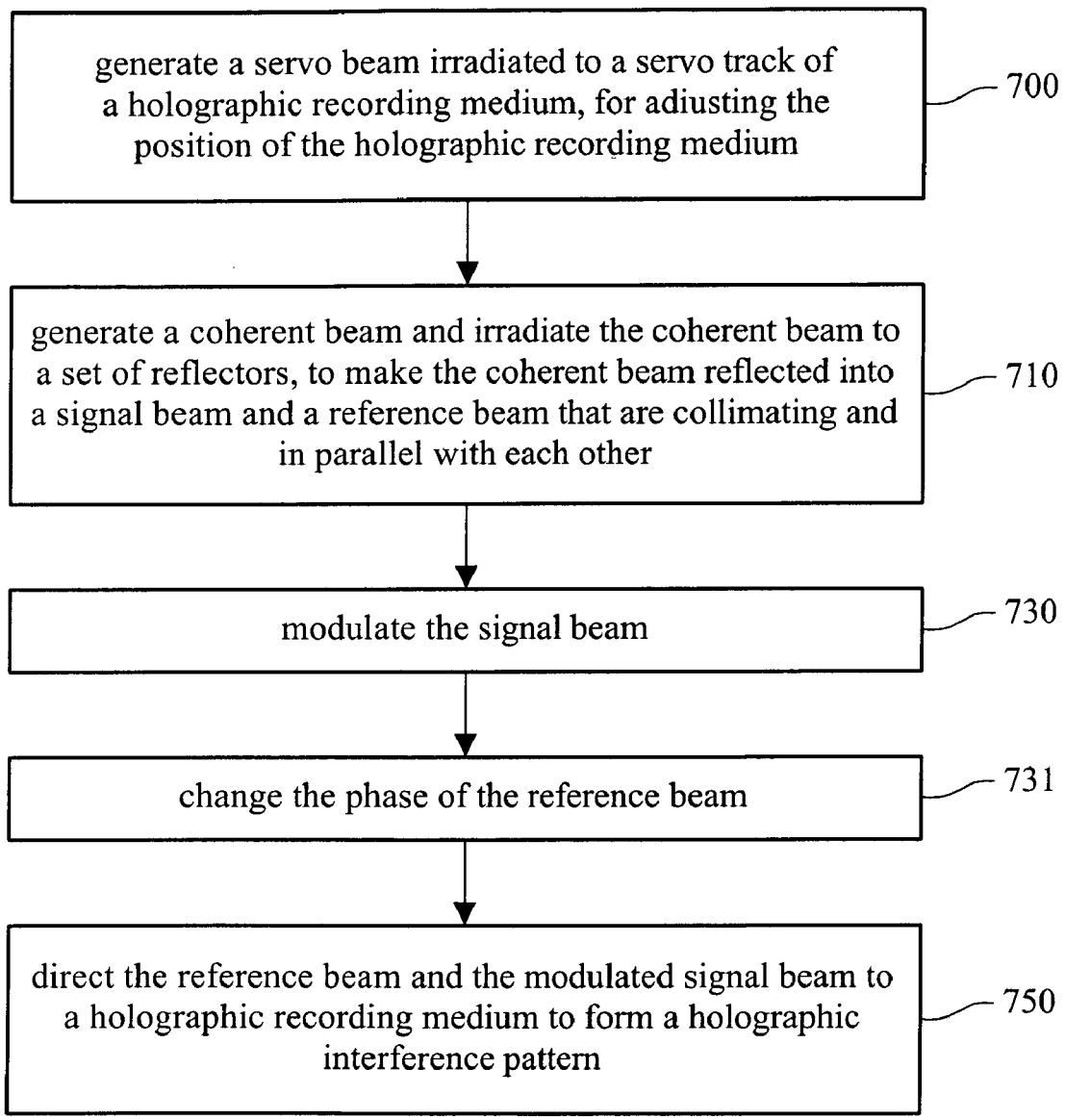

Referring to FIG. 16, after the signal beam is modulated (Step 730), the phase of the reference beam is changed (Step 731). Therefore, the holographic storage method has a phase multiplexing mechanism.

Or, the peristrophic multiplexing mechanism and the phase multiplexing mechanism can be added into the holographic storage method together.

Figure 17:
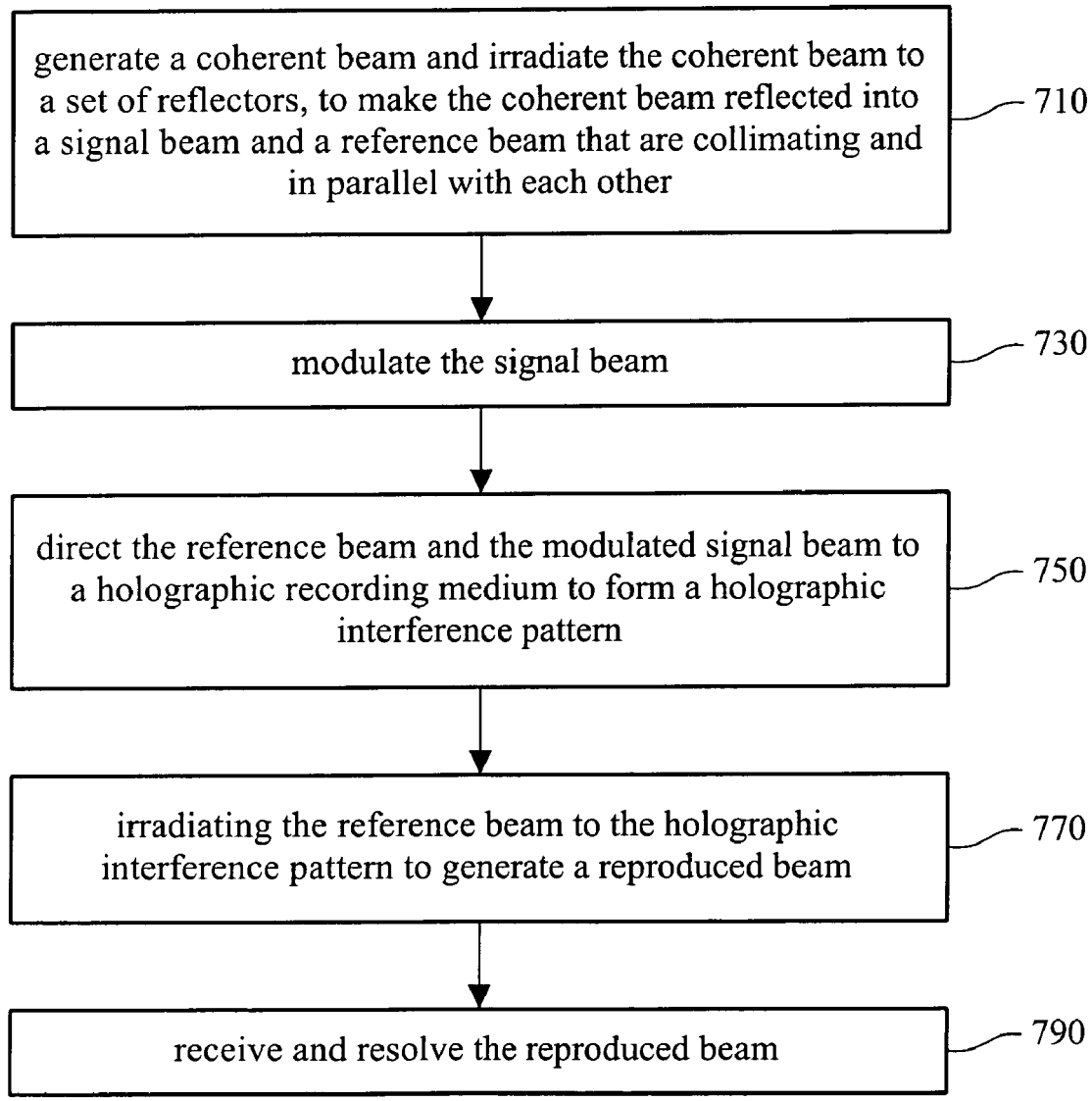
FIGS. 17, 18, and 19 are flow charts of the second method of the invention.

Referring to FIG. 17, it is a flow chart of the second method of the invention. A holographic storage method of the invention involves first generating a coherent beam incident to a set of reflectors to form a signal beam and a reference beam that are collimating and in parallel with each other (Step 710). Afterward, the signal beam is modulated (Step 730). The reference beam and the modulated signal beam are directed to a holographic recording medium to form a holographic interference pattern (Step 750). When the reference beam is irradiated to the holographic interference pattern, a reproduced beam is generated (Step 770). The reproduced beam is then received and resolved (Step 790).

Figure 18:
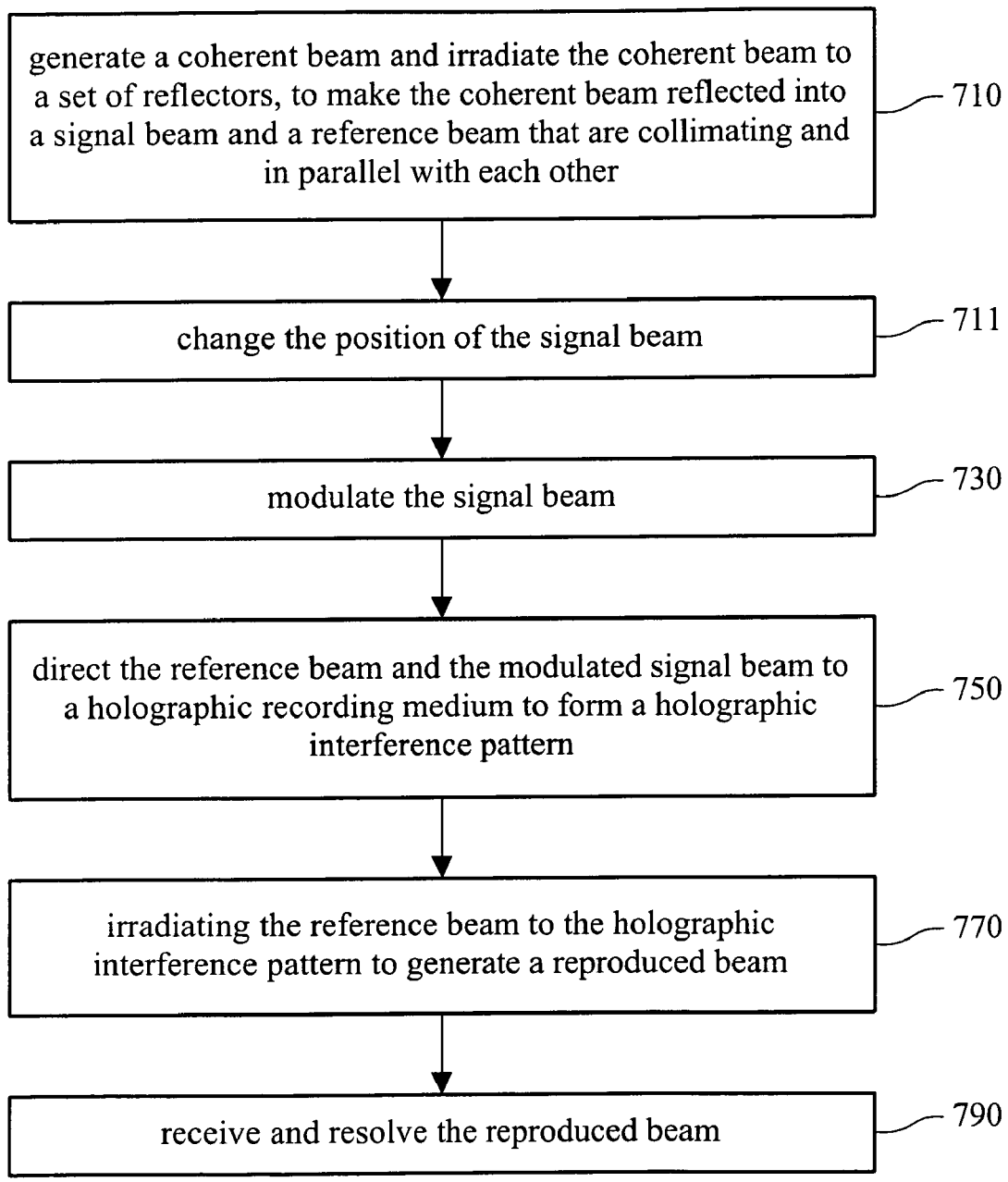

Referring to FIG. 18, after a coherent beam is generated and irradiated to a set of reflectors for reflect the beam into a signal beam and a reference beam that are collimating and in parallel with each other (Step 710), the position of the signal beam is changed (Step 711). Therefore, the holographic storage method has a peristrophic multiplexing mechanism.

Figure 19:
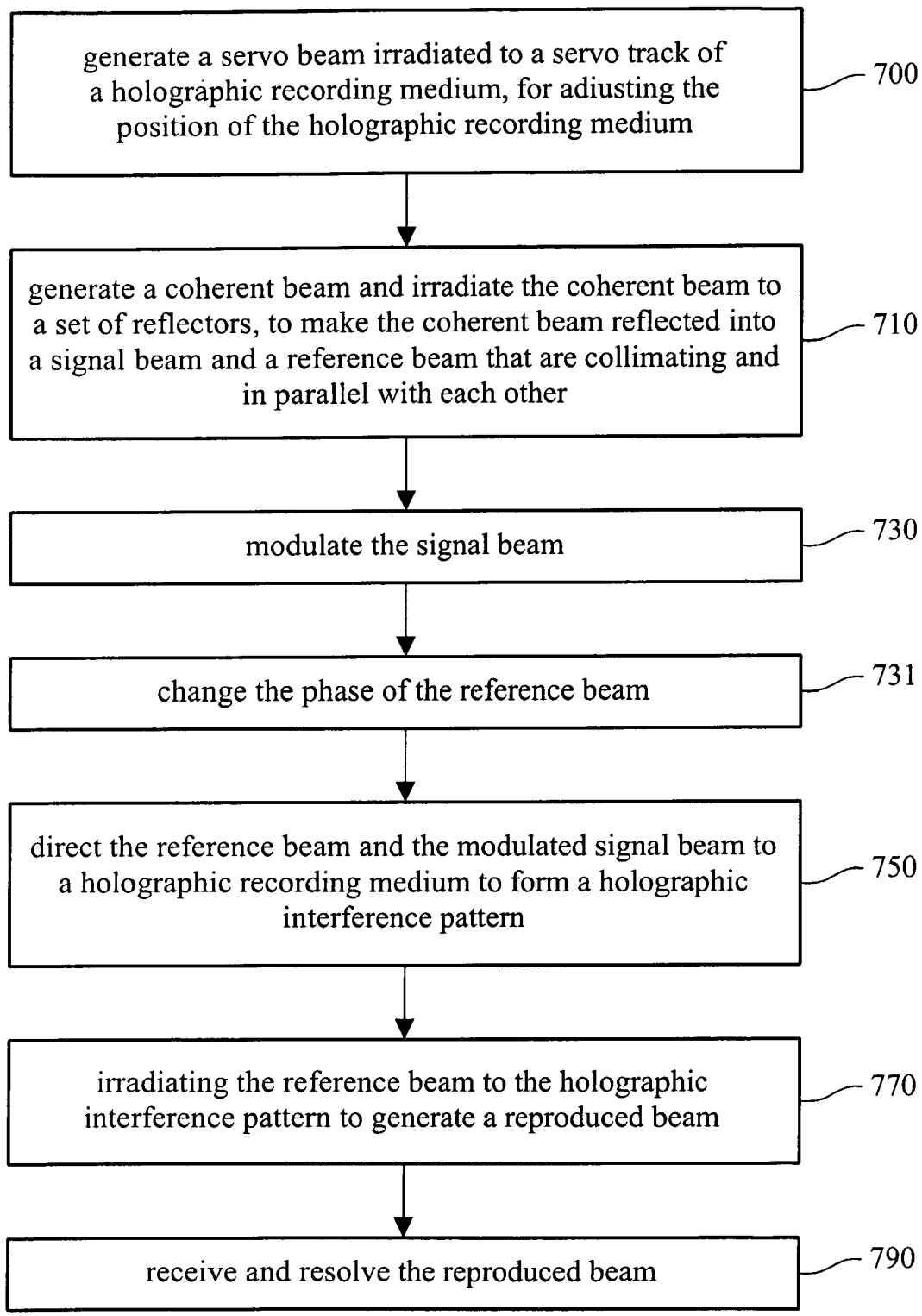

Referring to FIG. 19, after the signal beam is modulated (Step 730), the phase of the reference beam is changed (Step 731). Therefore, the holographic storage method has a phase multiplexing mechanism.

Or, the peristrophic multiplexing mechanism and the phase multiplexing mechanism can be added into the holographic storage method together.

Figure 20:
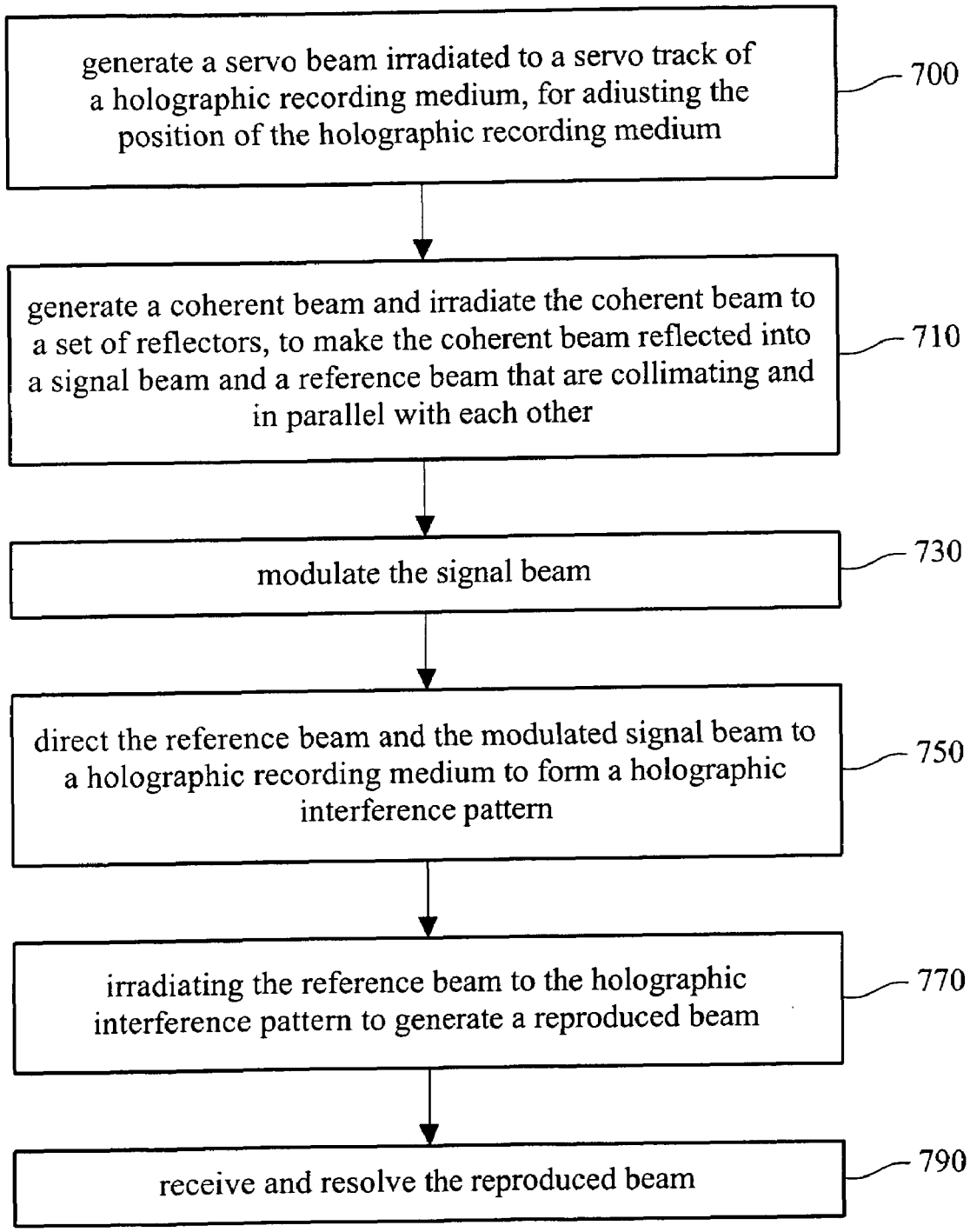
FIGS. 20, 21, and 22 are flow charts of the third method of the invention.

Referring to FIG. 20, it is a flow chart of the third method of the invention. To make the holographic interference pattern continuously recorded in the holographic recording medium, a method for holographic storage and reproduction involves first generating a servo beam irradiated to a servo track of a holographic recording medium for modulating the position of the holographic recording medium (Step 700). Afterward, a coherent beam is generated and irradiated to a set of reflectors for being reflected into a signal beam and a reference beam that are collimating and in parallel with each other (Step 710). Then, the signal beam is modulated (Step 730). The reference beam and the modulated signal beam are directed to the holographic recording medium to generate a holographic interference pattern (Step 750).

When the reference beam is irradiated to the holographic interference pattern, a reproduced beam is generated (Step 770). The reproduced beam is then received and resolved (Step 790).

Figure 21:
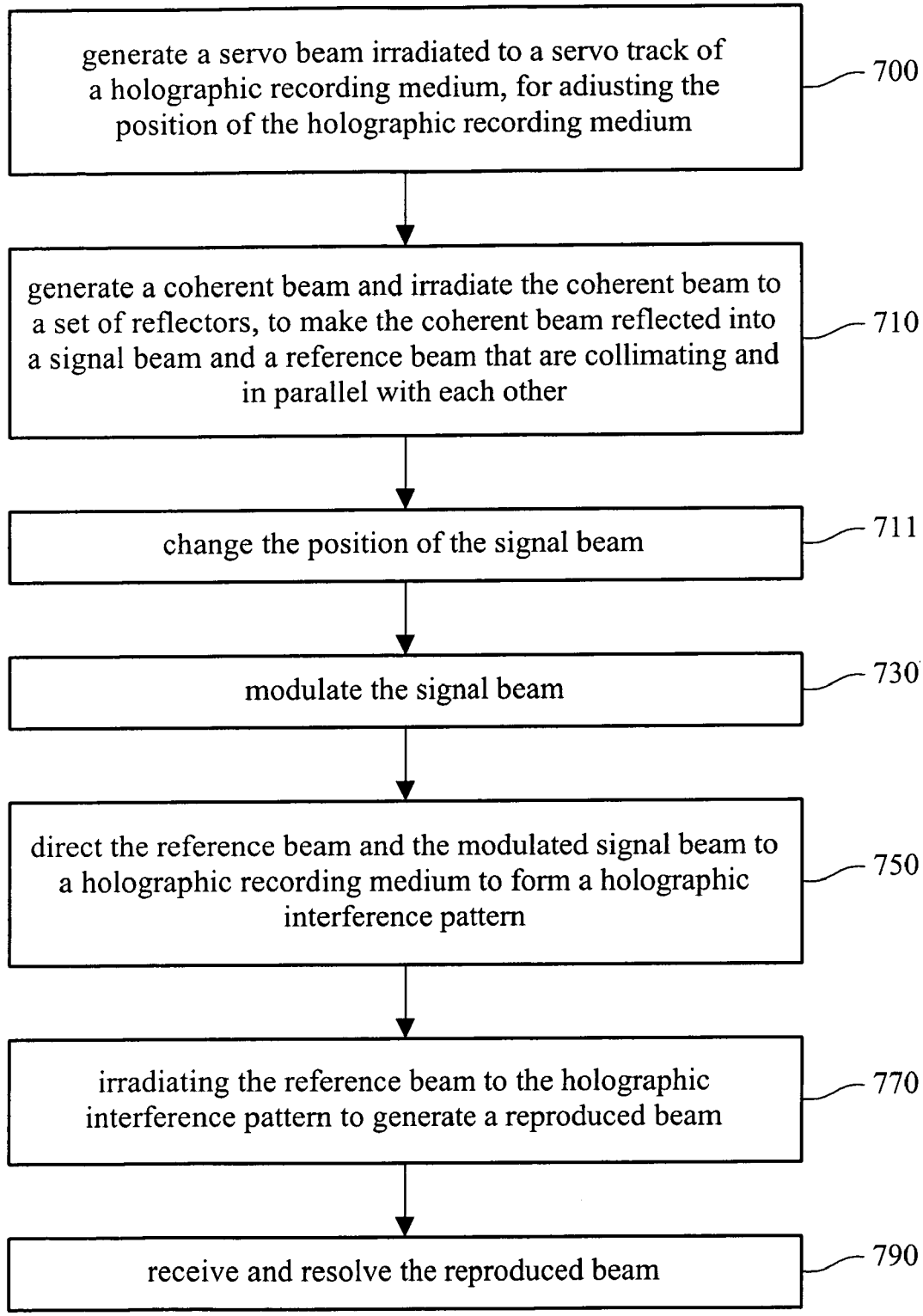

Referring to FIG. 21, after a coherent beam is generated and irradiated to a set of reflectors for reflecting the beam into a signal beam and a reference beam that are collimating and in parallel with each other (Step 710), the position of the signal beam is changed (Step 711). Therefore, the method for holographic storage and reproduction has a peristrophic multiplexing mechanism.

Figure 22:
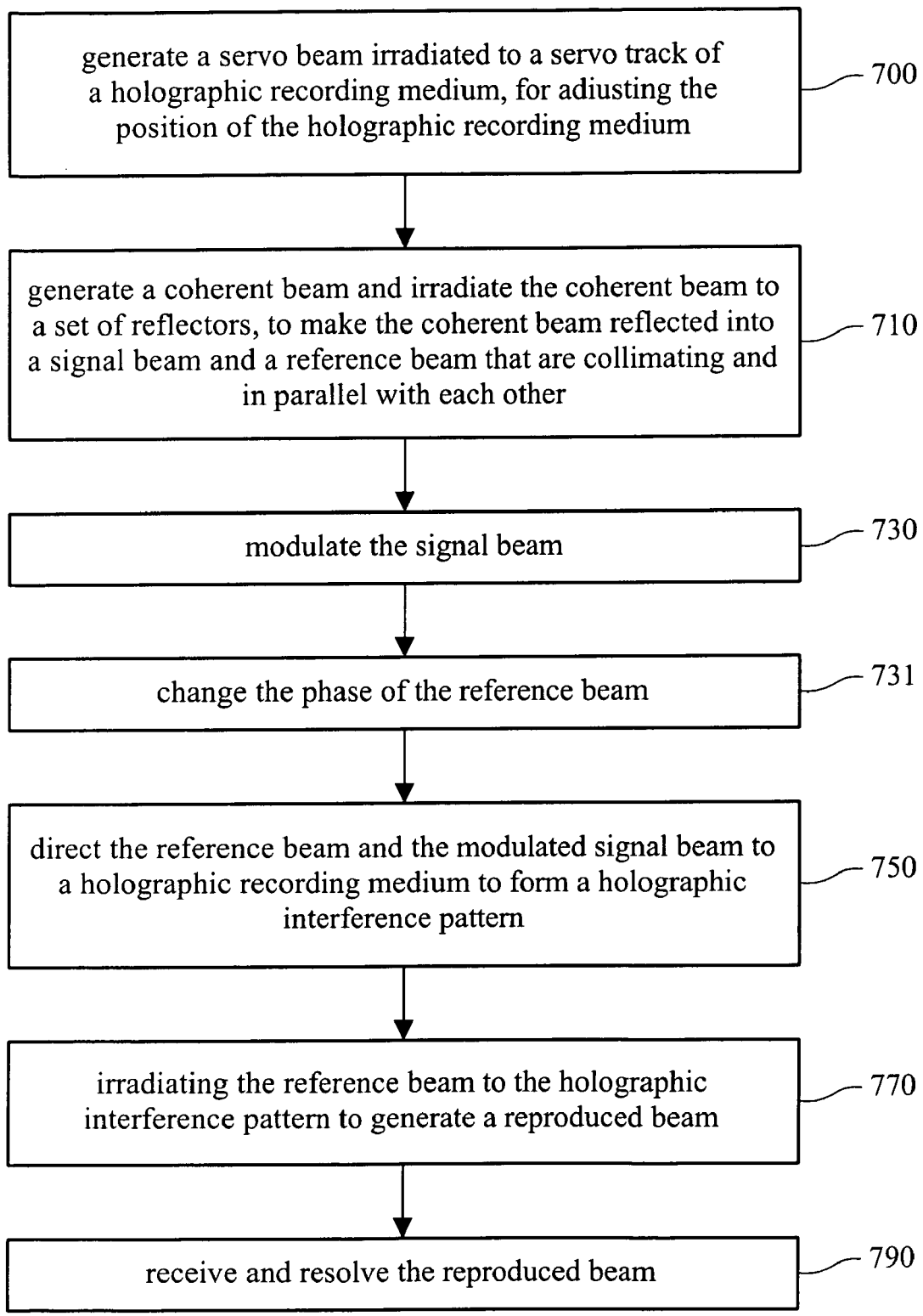

Referring to FIG. 22, after the signal beam is modulated (Step 730), the phase of the reference beam is changed (Step 731). Therefore, the method for holographic storage and reproduction has a phase multiplexing mechanism.

Or, the peristrophic multiplexing mechanism and the phase multiplexing mechanism can be added into the method for holographic storage and reproduction together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holographic storage system, for generating a holographic interference pattern in a holographic recording medium, the holographic storage system comprising:
    a light source, for generating a coherent beam;
    a first reflector, for reflecting the coherent beam to form a divergent beam;
    a second reflector, for reflecting the divergent beam and splitting it into a signal beam and a reference beam;
    a spatial light modulator (SLM), for modulating the signal beam; and
    a convergent unit, for directing the reference beam and the modulated signal beam to the holographic recording medium to form the holographic interference pattern.

2. The holographic storage system according to claim 1, wherein the first reflector is a convex mirror, and the second reflector is a concave mirror, for splitting the coherent beam sequentially irradiated to the convex mirror and the concave mirror into the signal beam and the reference beam in parallel.

3. The holographic storage system according to claim 1, wherein the SLM is a transmissive SLM.

4. The holographic storage system according to claim 1, wherein the light source is a multi-wavelength light source, for generating the coherent beam of multiple wavelengths.

5. The holographic storage system according to claim 4, wherein the multi-wavelength light source is formed of more than one secondary light source emitting the coherent beams of a certain wavelength.

6. The holographic storage system according to claim 5, further comprising a wavelength selector, wherein the wavelength selector includes:
    an aperture stop, for limiting the field of view angle of the incident beam; and
    a plate glass, to make the incident beam be parallel with the emergent beam but deviated from it by a certain distance when rotating, and thus making the incident beam irradiated to the aperture stop, thereby limiting a wavelength pass for the secondary light source, so as to let the coherent beam with the certain wavelength irradiate to the first reflector.

7. The holographic storage system according to claim 4, wherein the multi-wavelength light source is a wavelength-tunable light source.

8. The holographic storage system according to claim 1, wherein the convergent unit comprises:
a third reflector, for converting the reference beam and the modulated signal beam into a convergent beam; and
a fourth reflector, for directing the convergent beam into the holographic recording medium, and causing an interference with each other to form the holographic interference pattern.

9. The holographic storage system according to claim 8, wherein the third reflector is a concave mirror, and the fourth reflector is a convex mirror, to make the signal beam and the reference beam incident in parallel to the third reflector and the fourth reflector being directed to the holographic recording medium at the focus.

10. The holographic storage system according to claim 1, wherein the convergent unit comprises:
a third reflector, which is a flat mirror disposed on a hyperbolic curve; and
a fourth reflector, which is a flat mirror disposed on a parabolic curve, wherein the focuses of the hyperbolic curve and the parabolic curve are coincident such that the signal beam and the reference beam incident in parallel to the third reflector are reflected to be irradiated to the fourth reflector, and then directed in the holographic recording medium at the focus.

11. The holographic storage system according to claim 1, further comprising an SLM disposed in the path of the reference beam for changing the phase of the reference beam.

12. The holographic storage system according to claim 1, further comprising a shutter for controlling the passing of the light, wherein the shutter is disposed in the path of the signal beam for controlling the passing of the signal beam.

13. The holographic storage system according to claim 1, further comprising:
a second beam splitter, disposed in the path of the signal beam; and
a servo light source, for generating a servo beam, wherein the servo beam is sequentially irradiated to the first reflector, the second reflector, and the convergent unit, and directed to a servo track of the holographic recording medium; then, the servo beam is reflected by the servo track and irradiated to the convergent unit again; afterward, the servo beam returns along the original path of the signal beam and is irradiated to the second beam splitter; then is reflected and then incident to a sensing control portion, to make the holographic interference pattern continuously recorded in the holographic recording medium along the servo track.

14. The holographic storage system according to claim 1, further comprising:
a light detecting device;
a second recording medium used to replace the holographic recording medium;
a first beam splitter disposed on the path of the reference beam;
a second beam splitter disposed on the path of the signal beam; and
a second light source used to used to produce a recording/reproducing light, wherein the recording/reproducing light is incident upon the first beam splitter, reflects and turns to the focusing unit with an incident angle, and then is focused on the second recording medium to record data in the second recording medium; then the recording/reproducing light is incident upon the second recording medium, reflected by the second recording medium to the focusing unit with an incident angle, returned toward the path of reference beam, and then reflected by the second beam splitter to the light detecting device with an incident angle.

15. A holographic storage system, for generating a holographic interference pattern in a holographic recording medium, the holographic storage system comprising:
a light source, for generating a coherent beam;
a first reflector, for reflecting the coherent beam to form a divergent beam;
a second reflector, for reflecting the divergent beam and splitting it into a signal beam and a reference beam;
a SLM, for modulating the signal beam;
a convergent unit, for directing the reference beam and the modulated signal beam to the holographic recording medium to form the holographic interference pattern;
a first beam splitter, disposed in the path of the reference beam, for generating a reproduced beam when the reference beam is irradiated to the holographic interference pattern, wherein the reproduced beam returns along the path of the reference beam, and is irradiated to the first beam splitter and reflected to be irradiated to an image sensor;
a second beam splitter, disposed in the path of the signal beam; and
a servo light source, for generating a servo beam, wherein the servo beam is irradiated to the first reflector, the second reflector, and the convergent unit, and directed to a servo track of the holographic recording medium; then, the servo beam is reflected by the servo track and irradiated to the convergent unit again; afterward, the servo beam returns along the original path of the signal beam and is irradiated to the second beam splitter; then is reflected and then incident to a sensing control portion, to make the holographic interference pattern continuously recorded in the holographic recording medium along the servo track.

16. The holographic storage system according to claim 15, wherein the first reflector is a convex mirror, and the second reflector is a concave mirror, for splitting the coherent beam sequentially irradiated to the convex mirror and the concave mirror into the signal beam and the reference beam in parallel.

17. The holographic storage system according to claim 15, wherein the SLM is a transmissive SLM.

18. The holographic storage system according to claim 15, wherein the light source is a multi-wavelength light source, for generating the coherent beam of multiple wavelengths.

19. The holographic storage system according to claim 18, wherein the multi-wavelength light source is formed of more than one secondary light source emitting the coherent beams of a certain wavelength.

20. The holographic storage system according to claim 19, further comprising a wavelength selector, wherein the wavelength selector includes:
an aperture stop, for limiting the field of view angle of the incident beam; and
a plate glass, to make the incident beam be parallel with the emergent beam but deviated from it by a certain distance when rotating, and thus making the incident beam irradiated to the aperture stop, thereby limiting a wavelength pass for the secondary light source, so as to let the coherent beam with the certain wavelength irradiate to the first reflector.

21. The holographic storage system according to claim 18, wherein the multi-wavelength light source is a wavelength-tunable light source.

22. The holographic storage system according to claim 15, wherein the convergent unit comprises:
- a third reflector, for converting the reference beam and the modulated signal beam into a convergent beam; and
- a fourth reflector, for directing the convergent beam into the holographic recording medium, and causing an interference with each other to form the holographic interference pattern.

23. The holographic storage system according to claim 22, wherein the third reflector is a concave mirror, and the fourth reflector is a convex mirror, to make the signal beam and the reference beam incident in parallel to the third reflector and the fourth reflector being directed in the holographic recording medium at the focus.

24. The holographic storage system according to claim 15, wherein the convergent unit comprises:
- a third reflector, which is a flat mirror disposed on a hyperbolic curve; and
- a fourth reflector, which is a flat mirror disposed on a parabolic curve, wherein the focuses of the hyperbolic curve and the parabolic curve are coincident such that the signal beam and the reference beam incident in parallel to the third reflector are reflected to be irradiated to the fourth reflector, and then directed in the holographic recording medium at the focus.

25. The holographic storage system according to claim 15, further comprising a filter for filtering the servo beam, wherein the filter is disposed in the path of the signal beam for filtering the servo beam in the path of the signal beam.

26. The holographic storage system according to claim 15, further comprising an SLM disposed in the path of the reference beam for changing the phase of the reference beam.

27. The holographic storage system according to claim 15, further comprising a shutter for controlling the passing of the light, wherein the shutter is disposed in the path of the signal beam for controlling the passing of the signal beam.

28. A holographic storage system, for generating a holographic interference pattern in a holographic recording medium, the holographic storage system comprising:
- a light source, for generating a coherent beam;
- a first reflector, for reflecting the coherent beam to form a divergent beam;
- a second reflector, for reflecting the divergent beam and splitting it into a signal beam and a reference beam;
- a SLM, for modulating the signal beam;
- a convergent unit, for directing the reference beam and the modulated signal beam to the holographic recording medium to form the holographic interference pattern;
- a first beam splitter, disposed in the path of the reference beam, for generating a reproduced beam when the reference beam is irradiated to the holographic interference pattern, wherein the reproduced beam returns along the path of the reference beam, and is irradiated to the first beam splitter and reflected to be irradiated to an image sensor;
- a second beam splitter, disposed in the path of the signal beam;
- a servo light source, for generating a servo beam, wherein the servo beam is irradiated to the second reflector and reflected to be irradiated to the convergent unit; afterward, the servo beam is directed to a servo track of the holographic recording medium and reflected to be irradiated to the convergent unit again; then, the servo beam returns along the original path of the reference beam; and
- a dichroic beam splitter, for passing the coherent beam and reflecting the servo beam, and disposed in the path of the reference beam, wherein when the servo beam returning along the path of the reference beam is irradiated to the second beam splitter and reflected to be incident to a sensing control portion, to make the holographic interference pattern continuously recorded in the holographic recording medium along the servo track.

29. The holographic storage system according to claim 28, wherein the first reflector is a convex mirror, and the second reflector is a concave mirror, for splitting the coherent beam sequentially irradiated to the convex mirror and the concave mirror into the signal beam and the reference beam in parallel.

30. The holographic storage system according to claim 28, wherein the SLM is a transmissive SLM.

31. The holographic storage system according to claim 28, wherein the light source is a multi-wavelength light source, for generating the coherent beam of multiple wavelengths.

32. The holographic storage system according to claim 31, wherein the multi-wavelength light source is formed of more than one secondary light source emitting the coherent beams of a certain wavelength.

33. The holographic storage system according to claim 32, further comprising a wavelength selector, wherein the wavelength selector includes:
- an aperture stop, for limiting the field of view angle of the incident beam; and
- a plate glass, to make the incident beam be parallel with the emergent beam but deviated from it by a certain distance when rotating, and thus making the incident beam irradiated to the aperture stop, thereby limiting a wavelength pass for the secondary light source, so as to let the coherent beam with the certain wavelength irradiate to the first reflector.

34. The holographic storage system according to claim 31, wherein the multi-wavelength light source is a wavelength-tunable light source.

35. The holographic storage system according to claim 28, wherein the convergent unit comprises:
- a third reflector, for converting the reference beam and the modulated signal beam into a convergent beam; and
- a fourth reflector, for directing the convergent beam into the holographic recording medium, and causing an interference with each other to form the holographic interference pattern.

36. The holographic storage system according to claim 35, wherein the third reflector is a concave mirror, and the fourth reflector is a convex mirror, to make the signal beam and the reference beam incident in parallel to the third reflector and the fourth reflector being directed in the holographic recording medium at the focus.

37. The holographic storage system according to claim 28, wherein the convergent unit comprises:
- a third reflector, which is a flat mirror disposed on a hyperbolic curve; and
- a fourth reflector, which is a flat mirror disposed on a parabolic curve, wherein the focuses of the hyperbolic curve and the parabolic curve are coincident such that the signal beam and the reference beam incident in parallel to the third reflector are reflected to be irradiated to the fourth reflector, and then directed in the holographic recording medium at the focus.

38. The holographic storage system according to claim 28, further comprising an SLM disposed in the path of the reference beam for changing the phase of the reference beam.

39. The holographic storage system according to claim 28, further comprising a shutter for controlling the passing of the light, wherein the shutter is disposed in the path of the signal beam for controlling the passing of the signal beam.

* * * * *